United States Patent
Tateishi et al.

(10) Patent No.: US 10,469,129 B2
(45) Date of Patent: Nov. 5, 2019

(54) VEHICLE-MOUNTED APPARATUS, RELAY APPARATUS AND COMPUTER PROGRAM

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hiroshi Tateishi, Mie (JP); Hiroshi Ueda, Mie (JP); Tomohiro Mizutani, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/863,024

(22) Filed: Jan. 5, 2018

(65) Prior Publication Data

US 2018/0205414 A1    Jul. 19, 2018

(30) Foreign Application Priority Data

Jan. 13, 2017 (JP) .................................. 2017-004524
Mar. 30, 2017 (JP) .................................. 2017-068330

(51) Int. Cl.
*H04B 3/36* (2006.01)
*B60R 16/023* (2006.01)
(Continued)

(52) U.S. Cl.
CPC .............. *H04B 3/36* (2013.01); *B60R 16/023* (2013.01); *G06F 21/44* (2013.01); *G06F 21/57* (2013.01); *H04B 3/50* (2013.01)

(58) Field of Classification Search
CPC ........ B60R 2021/01006; B60R 16/023; H04B 3/36; G06F 21/44; H04W 84/005; H04W 4/48

See application file for complete search history.

(56) References Cited

U.S. PATENT DOCUMENTS

2006/0271694 A1 * 11/2006 Matsuo ............... H04L 12/4135
709/229
2014/0309870 A1 * 10/2014 Ricci ....................... H04W 4/21
701/36

(Continued)

FOREIGN PATENT DOCUMENTS

JP    2009-259160 A    11/2009

*Primary Examiner* — Shukri Taha
(74) *Attorney, Agent, or Firm* — Honigman LLP

(57) ABSTRACT

Provided is a small and inexpensive vehicle-mounted apparatus including a first vehicle-mounted device and a second vehicle-mounted device, a small and inexpensive relay apparatus including a first relay device and a second relay device, and computer programs executed by the vehicle-mounted apparatus and the relay apparatus. A relay apparatus includes a first relay device that executes a process in accordance with a first control program and a second relay device that executes a process in accordance with a second control program. A Hardwar Security Module (HSM) of the first relay device verifies the second control program. The second vehicle-mounted device computes associated data pertaining to the second control program. The HSM verifies the second control program by determining whether or not the associated data computed by the second relay device matches reference data.

12 Claims, 18 Drawing Sheets

(51) Int. Cl.
*G06F 21/44* (2013.01)
*G06F 21/57* (2013.01)
*H04B 3/50* (2006.01)

(56) References Cited

U.S. PATENT DOCUMENTS

| | | | | |
|---|---|---|---|---|
| 2015/0243110 A1* | 8/2015 | Lee | ................ | G07C 5/0808 |
| | | | | 701/31.4 |
| 2015/0355917 A1* | 12/2015 | Tsujimura | ......... | H04L 12/40006 |
| | | | | 710/104 |
| 2015/0358351 A1* | 12/2015 | Otsuka | ............... | H04L 12/4625 |
| | | | | 726/23 |
| 2017/0307390 A1* | 10/2017 | Uyeki | ................ | H04L 67/18 |
| 2017/0338835 A1* | 11/2017 | Priller | ................ | H04L 1/004 |
| 2018/0091550 A1* | 3/2018 | Cho | ................ | B60R 16/0232 |
| 2018/0103414 A1* | 4/2018 | Golsch | ................ | B60R 25/24 |

\* cited by examiner

VEHICLE-MOUNTED APPARATUS, RELAY APPARATUS AND COMPUTER PROGRAM

CROSS-REFERENCE TO RELATED APPLICATIONS

This application claims priority of Japanese Patent Application Nos. JP 2017-068330 filed Mar. 30, 2017 and JP 2017-004524 filed on Jan. 13, 2017.

TECHNICAL FIELD

The present invention relates to a vehicle-mounted apparatus, a relay apparatus that relays communication between communication apparatuses, and computer programs run by the vehicle-mounted apparatus and the relay apparatus, respectively.

BACKGROUND

A communication system in which a relay apparatus relays communication among a plurality of Electronic Control Units (ECUs) that control the operations of electric devices is an example of a communication system mounted in a vehicle. In such a communication system, each of the ECUs functions as a communication apparatus, and one ECU communicates with the other ECUs via the relay apparatus. A plurality of electric devices can be made to operate cooperatively by the plurality of ECUs communicating with each other. The relay apparatus sends data received from one ECU to the other ECUs.

A control program is stored in the relay apparatus. The relay apparatus executes a relay process for relaying communication by a Central Processing Unit (CPU) executing the control program. If the control program stored in the relay apparatus has been tampered with, the relay apparatus will not send the data legitimately, and there is thus a risk that the electric devices will not operate correctly. It is thus necessary to verify that the control program is legitimate when the relay apparatus is started up.

JP 2009-259160A discloses a technique for verifying that a control program is legitimate. According to this technique, associated data pertaining to the control program is computed, and it is determined whether or not the associated data that has been computed matches one of a plurality of pieces of predetermined data stored in advance. The control program is determined to be legitimate when the associated data that has been computed matches one of the plurality of pieces of predetermined data.

Multiple protocols are used for communication in vehicles. Thus a relay apparatus including a first relay device that relays communication among a plurality of first communication apparatuses and a second relay device that relays communication among a plurality of second communication apparatuses is conceivable as the relay apparatus.

With this relay apparatus, the plurality of first communication apparatuses communicate using a first protocol and the plurality of second communication apparatuses communicate using a second protocol, for example. The first relay device is also connected to the second relay device, and the first relay device and the second relay device relay communication among the first communication apparatuses and the second communication apparatuses.

With a relay apparatus including a first relay device and a second relay device, a CPU is provided in both the first relay device and the second relay device, and the control program executed by the CPU of the first relay device is different from the control program executed by the CPU of the second relay device. In this case, it is necessary to verify both of the control programs. A relay apparatus in which both the first relay device and the second relay device have a verification function for verifying that the control programs are legitimate is conceivable as a relay apparatus that verifies the control programs in both the first relay device and the second relay device.

However, if the first relay device and the second relay device both have a verification function, there are problems in that the relay apparatus will have a large size and the manufacturing costs will increase.

Such problems are not limited to vehicle-mounted apparatuses and relay apparatuses. Similar problems arise in a vehicle-mounted apparatus including a first vehicle-mounted device in which processing is executed according to a first control program and a second vehicle-mounted device in which processing is executed according to a second control program different from the first control program.

Having been conceived in light of such circumstances, an object of the present invention is to provide a small and inexpensive vehicle-mounted apparatus including a first vehicle-mounted device and a second vehicle-mounted device, a small and inexpensive relay apparatus including a first relay device and a second relay device, and computer programs executed by the vehicle-mounted apparatus and the relay apparatus.

SUMMARY

A vehicle-mounted apparatus according to an aspect of the present invention is a vehicle-mounted apparatus including a first vehicle-mounted device having a first processing unit that executes a process in accordance with a first control program and a verifier that verifies the first control program using other hardware that is different from hardware constituting the first processing unit. The vehicle-mounted apparatus includes a second vehicle-mounted device including a second processing unit that executes a process in accordance with a second control program, and an associated data computation unit that computes associated data pertaining to the second control program. The verifier includes a determination unit that determines whether or not the associated data computed by the associated data computation unit matches reference data.

According to this aspect of the present invention, the verifier of the first vehicle-mounted device verifies the second control program by determining whether or not the associated data pertaining to the second control program of the second vehicle-mounted device matches reference data. It is thus not necessary for the second vehicle-mounted device to have a function for verifying the second control program, and thus the apparatus is small and inexpensive to produce.

In the vehicle-mounted apparatus according to another aspect of the present invention, the verifier verifies the first control program by the other hardware executing a verification program.

According to this aspect of the invention, the first control program is verified by the other hardware, which is different from the hardware constituting the first processing unit, executing the verification program.

In the vehicle-mounted apparatus according to another aspect of the present invention, the verifier of the first vehicle-mounted device includes the associated data computation unit, a random number generation unit that generates random number data, and a reference data computation unit that computes the reference data on the basis of the random number data generated by the random number generation unit and predetermined data. The second vehicle-mounted device includes a calculation unit that calculates computation data for computing the associated data on the basis of the second control program and the random number data. The associated data computation unit of the verifier computes the associated data on the basis of the computation data calculated by the calculation unit.

According to this aspect of the invention, the verifier of the first vehicle-mounted device generates the random number data, and computes the reference data on the basis of the generated random number data and the predetermined data. The second vehicle-mounted device obtains the random number data generated by the verifier, and calculates the computation data on the basis of the obtained random number data and the second control program. The verifier obtains the computation data calculated by the second vehicle-mounted device, computes the associated data on the basis of the obtained computation data, and determines whether or not the associated data and the reference data match.

If the random number data generated by the verifier has changed, the computation data calculated by the second vehicle-mounted device will be changed as well. For example, assume that the random number data is changed each time the verifier verifies the second control program. In this case, the computation data is changed each time the verifier verifies the second control program, and thus the result of verifying the second control program is highly reliable.

In the vehicle-mounted apparatus according to another aspect of the present invention, the verifier of the first vehicle-mounted device includes a storage unit that stores key data; the reference data computation unit computes the reference data on the basis of the key data stored in the storage unit, the random number data, and the predetermined data; and the associated data computation unit computes the associated data on the basis of the computation data and the key data.

According to this aspect of the invention, the verifier of the first vehicle-mounted device computes the reference data on the basis of the key data, the random number data, and the predetermined data, and computes the associated data on the basis of the computation data computed by the second vehicle-mounted device and the key data. Accordingly, the result of verifying the second control program is highly reliable.

In the vehicle-mounted apparatus according to another aspect of the present invention, the verifier of the first vehicle-mounted device includes a random number generation unit that generates random number data, and a reference data computation unit that computes the reference data on the basis of the random number data generated by the random number generation unit and predetermined data. The second vehicle-mounted device includes the associated data computation unit. The associated data computation unit computes the associated data on the basis of the second control program and the random number data.

According to this aspect of the invention, the verifier of the first vehicle-mounted device generates the random number data, and computes the reference data on the basis of the generated random number data and the predetermined data. The second vehicle-mounted device obtains the random number data generated by the verifier, and computes the associated data on the basis of the obtained random number data and the second control program. The verifier obtains the associated data computed by the second vehicle-mounted device, and determines whether or not the obtained associated data and the reference data match.

If the random number data generated by the verifier has changed, the associated data computed by the second vehicle-mounted device will be changed as well. For example, assume that the random number data is changed each time the verifier verifies the second control program. In this case, the associated data obtained by the verifier from the second vehicle-mounted device is changed each time the verifier verifies the second control program, and thus the result of verifying the second control program is highly reliable.

The vehicle-mounted apparatus according to another aspect of the invention further includes an operation control unit that stops operations of the second vehicle-mounted device in the case where the determination unit of the verifier has determined that the associated data and the reference data do not match.

According to this aspect of the invention, if the verifier of the first vehicle-mounted device has determined that the associated data and the predetermined data do not match, it is assumed that the second control program has likely been tampered with, and the second vehicle-mounted device stops operations.

A relay apparatus according to another aspect of the invention is a relay apparatus for a vehicle, the relay apparatus including a first relay device that relays communication among a plurality of first communication apparatuses and a second relay device that executes a process in accordance with a control program and relays communication among a plurality of second communication apparatuses, and the first relay device and the second relay device relaying communication between the first communication apparatuses and the second communication apparatuses. The first relay device includes a storage unit that stores key data, a computation unit that computes associated data pertaining to the control program of the second relay device using the key data, and a determination unit that determines whether or not the associated data computed by the computation unit matches predetermined data.

According to this aspect of the invention, in the second relay device, a process is executed in accordance with the control program. Using the key data, the first relay device computes the associated data pertaining to the control program of the second relay device, and determines whether the computed associated data and the predetermined data match. If the associated data and the predetermined data match, for example, the first relay device notifies the second relay device that the control program is legitimate, and the second relay device starts the process in accordance with the control program.

As described above, the first relay device verifies the control program of the second relay device as legitimate, and thus it is not necessary for both the first relay device and the second relay device to have a function for verifying the control program. The apparatus is thus small and inexpensive to produce.

The relay apparatus according to another aspect of the invention further includes an operation control unit that stops operations of the second relay device in the case where the determination unit of the first relay device has determined that the associated data and the predetermined data do not match.

According to this aspect of the invention, if the first relay device has determined that the associated data and the predetermined data do not match, it is assumed that the control program of the second relay device has likely been tampered with, and the second relay device stops operations.

In the relay apparatus according to another aspect of the invention, the second relay device includes a calculation unit that calculates computation data for computing the associated data; the first relay device includes an obtainment unit that obtains the computation data calculated by the calculation unit; and the computation unit of the first relay device computes the associated data using the key data and the computation data obtained by the obtainment unit.

According to this aspect of the invention, the second relay device calculates the computation data for computing the associated data. The first relay device obtains the computation data from the second relay device, and computes the associated data using the key data and the computation data. For example, if the size of the computation data is smaller than the size of the control program, only a small amount of data is transferred from the second relay device to the first relay device in order to verify that the control program is legitimate. In this case, only a short amount of time is required for the verification.

In the relay apparatus according to another aspect of the invention, the first relay device includes a processing unit that executes a process in accordance with a second control program, a second storage unit that stores second key data, a second computation unit that computes second associated data pertaining to the second control program using the second key data, and a second determination unit that determines whether or not the second associated data computed by the second computation unit matches second predetermined data.

According to this aspect of the invention, in the first relay device, a process is executed in accordance with the second control program. The first relay device verifies the control program of the second relay device by computing the associated data using the key data, and verifies that its own second control program is legitimate by computing the second associated data using the second key data.

The relay apparatus according to another aspect of the invention further includes a conversion unit that converts data corresponding to a first protocol used in the communication among the plurality of first communication apparatuses into data corresponding to a second protocol used in the communication among the plurality of second communication apparatuses, and converts data corresponding to the second protocol into data corresponding to the first protocol.

According to this aspect of the invention, the first protocol is used in the communication among the plurality of first communication apparatuses, and the second protocol is used in the communication among the plurality of second communication apparatuses. When communication is carried out between the first communication apparatus and the second communication apparatus, data corresponding to the first protocol is converted into data corresponding to the second protocol, and data corresponding to the second protocol is converted into data corresponding to the first protocol.

A computer program according to another aspect of the invention is a computer program executed by a verifier of a vehicle-mounted apparatus, the vehicle-mounted apparatus including a first vehicle-mounted device and a second vehicle-mounted device, the first vehicle-mounted device having a first processing unit that executes a process in accordance with a first control program and the verifier that verifies the first control program using other hardware that is different from hardware constituting the first processing unit, and the second vehicle-mounted device executing a process in accordance with a second control program. The computer program causes a computer to compute associated data pertaining to the second control program, and determine whether or not the computed associated data matches reference data.

According to this aspect of the invention, the verifier of the first vehicle-mounted device verifies the second control program by determining whether or not the associated data pertaining to the second control program of the second vehicle-mounted device matches reference data. It is thus not necessary for the second vehicle-mounted device to have a function for verifying the second control program, and thus the vehicle-mounted apparatus is small and inexpensive to produce.

A computer program according to another aspect of the invention is a computer program executed by a verifier of a vehicle-mounted apparatus, the vehicle-mounted apparatus including a first vehicle-mounted device and a second vehicle-mounted device, the first vehicle-mounted device having a first processing unit that executes a process in accordance with a first control program and the verifier that verifies the first control program using other hardware that is different from hardware constituting the first processing unit, and the second vehicle-mounted device executing a process in accordance with a second control program. The computer program causes a computer to obtain associated data pertaining to the second control program, and determine whether or not the obtained associated data matches reference data.

According to this aspect of the invention, the verifier of the first vehicle-mounted device verifies the second control program by determining whether or not the associated data pertaining to the second control program of the second vehicle-mounted device matches reference data. It is thus not necessary for the second vehicle-mounted device to have a function for verifying the second control program, and thus the vehicle-mounted apparatus is small and inexpensive to produce.

A computer program according to another aspect of the invention is a computer program executed by a first relay device of a relay apparatus for a vehicle, the relay apparatus including the first relay device that relays communication among a plurality of first communication apparatuses and a second relay device that executes a process in accordance with a control program and relays communication among a plurality of second communication apparatuses, and the first relay device and the second relay device relaying communication between the first communication apparatuses and the second communication apparatuses. The computer program causes a computer to compute associated data pertaining to the control program of the second relay device using key data stored in advance, and determine whether or not the computed associated data matches predetermined data.

According to this aspect of the invention, the first relay device verifies the control program of the second relay device by determining whether or not the associated data pertaining to the control program of the second relay device matches reference data. It is thus not necessary for the second relay device to have a function for verifying the control program, and thus the relay apparatus is small and inexpensive to produce.

According to aspects of the invention, small and inexpensive apparatuses can be realized.

DETAILED DESCRIPTION OF PREFERRED EMBODIMENTS

The present invention will be described in detail hereinafter on the basis of drawings illustrating embodiments thereof.

First Embodiment

Figure 1:
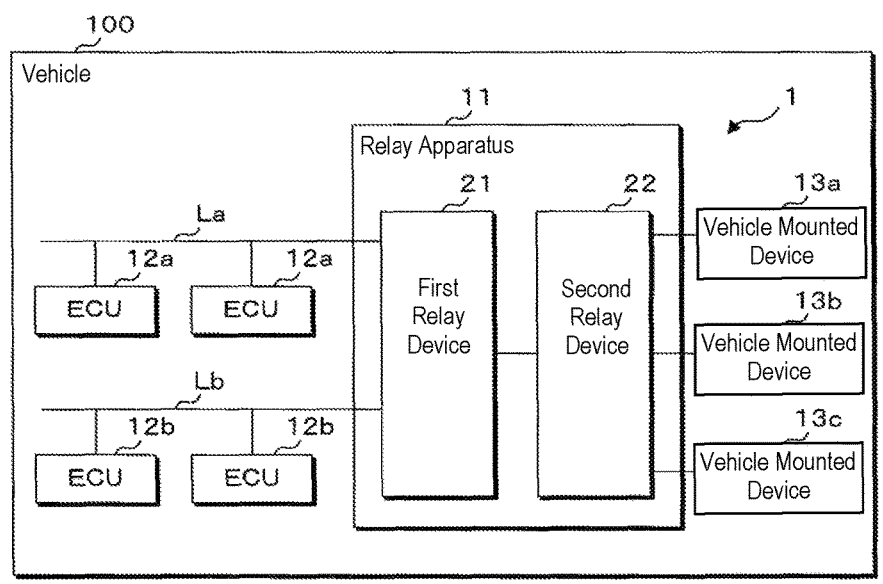
FIG. 1 is a block diagram illustrating the primary configuration of a communication system according to a first embodiment.

FIG. 1 is a block diagram illustrating the primary configuration of a communication system 1 according to a first embodiment. The communication system 1 is favorably mounted in a vehicle 100, and includes a relay apparatus 11, ECUs 12a, 12a, 12b, and 12b, vehicle-mounted devices 13a, 13b, and 13c, and communication lines La and Lb. The relay apparatus 11 includes a first relay device 21 and a second relay device 22.

The relay apparatus 11, the first relay device 21, and the second relay device 22 function as a vehicle-mounted apparatus, a first vehicle-mounted device, and a second vehicle-mounted device, respectively.

The two communication lines La and Lb are individually connected to the first relay device 21 of the relay apparatus 11. Two of the ECUs 12a and 12a are connected to the communication line La. Two of the ECUs 12b and 12b are connected to the communication line Lb. In the relay apparatus 11, the first relay device 21 is connected to the second relay device 22. The three vehicle-mounted devices 13a, 13b, and 13c are individually connected to the second relay device 22.

Communication is carried out according to the Controller Area Network (CAN) protocol over the communication lines La and Lb. The communication lines La and Lb are twisted pair lines. ECU data including identification information is transmitted over the communication lines La and Lb according to the CAN protocol. The identification information is information identifying the ECU data including that identification information.

The ECUs 12a and 12a and the first relay device 21 transmit the ECU data over the communication line La. The ECU data transmitted by one of the ECUs 12a and 12a and the first relay device 21 is received by all of the other devices. For example, the ECU data transmitted by one ECU 12a is received by the other ECU 12a and the first relay device 21.

Likewise, the ECUs 12b and 12b and the first relay device 21 transmit the ECU data over the communication line Lb. The ECU data transmitted by one of the ECUs 12b and 12b and the first relay device 21 is received by all of the other devices. For example, the ECU data transmitted by one ECU 12b is received by the other ECU 12b and the first relay device 21.

When the ECUs 12a and 12a have each received the ECU data, the ECUs 12a and 12a determine whether or not processing pertaining to that ECU data is to be executed on the basis of the identification information included in the received ECU data. If the ECUs 12a and 12a have determined that the processing pertaining to the received ECU data is to be executed, the ECUs 12a and 12a execute the processing pertaining to the received ECU data. If the ECUs 12a and 12a have determined that the processing pertaining to the received ECU data is not to be executed, the ECUs 12a and 12a abandon or delete the received ECU data.

Likewise, when the ECUs 12b and 12b have each received the ECU data, the ECUs 12b and 12b determine whether or not processing pertaining to that ECU data is to be executed on the basis of the identification information included in the received ECU data. If the ECUs 12b and 12b have determined that the processing pertaining to the received ECU data is to be executed, the ECUs 12b and 12b execute the processing pertaining to the received ECU data. If the ECUs 12b and 12b have determined that the processing pertaining to the received ECU data is not to be executed, the ECUs 12b and 12b abandon or delete the received ECU data.

Electric devices (not illustrated) are connected to each of the ECUs 12a, 12a, 12b, and 12b. As the processing pertaining to the received ECU data, each of the ECUs 12a, 12a, 12b, and 12b executes a process for controlling the operations of the electric device connected to that ECU on the basis of details indicated by the received ECU data, for example.

If, for example, a sensor is connected to each of the ECUs 12a, 12a, 12b, and 12b, the ECUs 12a, 12a, 12b, and 12b transmit ECU data indicating detection values detected by the corresponding sensors. Alternatively, if, for example, an accepting unit (input unit) that accepts instructions from a user is connected to each of the ECUs 12a, 12a, 12b, and 12b, the ECUs 12a, 12a, 12b, and 12b transmit ECU data indicating details of the instructions accepted by the corresponding accepting units. For example, if a window motor that opens/closes a power window of the vehicle is connected to one ECU 12a, the other ECU 12a transmits ECU data instructing the power window to be opened. The one ECU 12a causes the window motor to open the power window when such ECU data is received.

The first relay device 21 relays communication between one of the ECUs 12a and 12a and one of the ECUs 12b and 12b. Specifically, the first relay device 21 transmits the ECU data, received over the communication line La, over the communication line Lb, and transmits the ECU data, received over the communication line Lb, over the communication line La. Each of the ECUs 12a, 12a, 12b, and 12b functions as a first communication apparatus. The CAN protocol is used for the communication between one of the ECUs 12a and 12a and one of the ECUs 12b and 12b.

Each of the vehicle-mounted devices 13a, 13b, and 13c communicates one-to-one with the second relay device 22. Communication based on the Ethernet (trade name) standard, for example, is carried out between each of the vehicle-mounted devices 13a, 13b, and 13c and the second relay device 22. Each of the vehicle-mounted devices 13a, 13b, and 13c transmits, to the second relay device 22, device data including transmission destination information indicating a transmission destination. The second relay device 22 relays the communication carried out between two of the vehicle-mounted devices 13a, 13b, and 13c. Each of the vehicle-mounted devices 13a, 13b, and 13c functions as a second communication apparatus. For example, Transmission Control Protocol (TCP)/Internet Protocol (IP), which is one protocol compliant with Ethernet (trade name), is used for the communication between two of the vehicle-mounted devices 13a, 13b, and 13c.

The vehicle-mounted devices 13a and 13b are assumed to be a camera and a display, respectively. In this case, the vehicle-mounted device 13a transmits, to the second relay device 22, device data including image data captured by the camera. This device data includes transmission destination information indicating the vehicle-mounted device 13b as the transmission destination. The second relay device 22 transmits the device data including the image data to the vehicle-mounted device 13b. The vehicle-mounted device 13b displays an image on the basis of the image data included in the device data received from the second relay device 22.

The first relay device 21 and the second relay device 22 relay communication between one of the ECUs 12a, 12a, 12b, and 12b and one of the vehicle-mounted devices 13a, 13b, and 13c.

As described earlier, the ECU data is data compliant with the CAN protocol, and corresponds to data compliant with a first protocol. The device data is data compliant with the protocol used in the communication between two of the vehicle-mounted devices 13a, 13b, and 13c, and corresponds to data compliant with a second protocol.

The first relay device 21 converts the ECU data received over one of the communication lines La and Lb into device data. The second relay device 22 transmits the device data converted by the first relay device 21 to one of the vehicle-mounted devices 13a, 13b, and 13c. The second relay device 22 receives the device data from one of the vehicle-mounted devices 13a, 13b, and 13c. The first relay device 21 converts the device data received by the second relay device 22 into ECU data and transmits the converted ECU data over at least one of the communication lines La and Lb.

Figure 2:
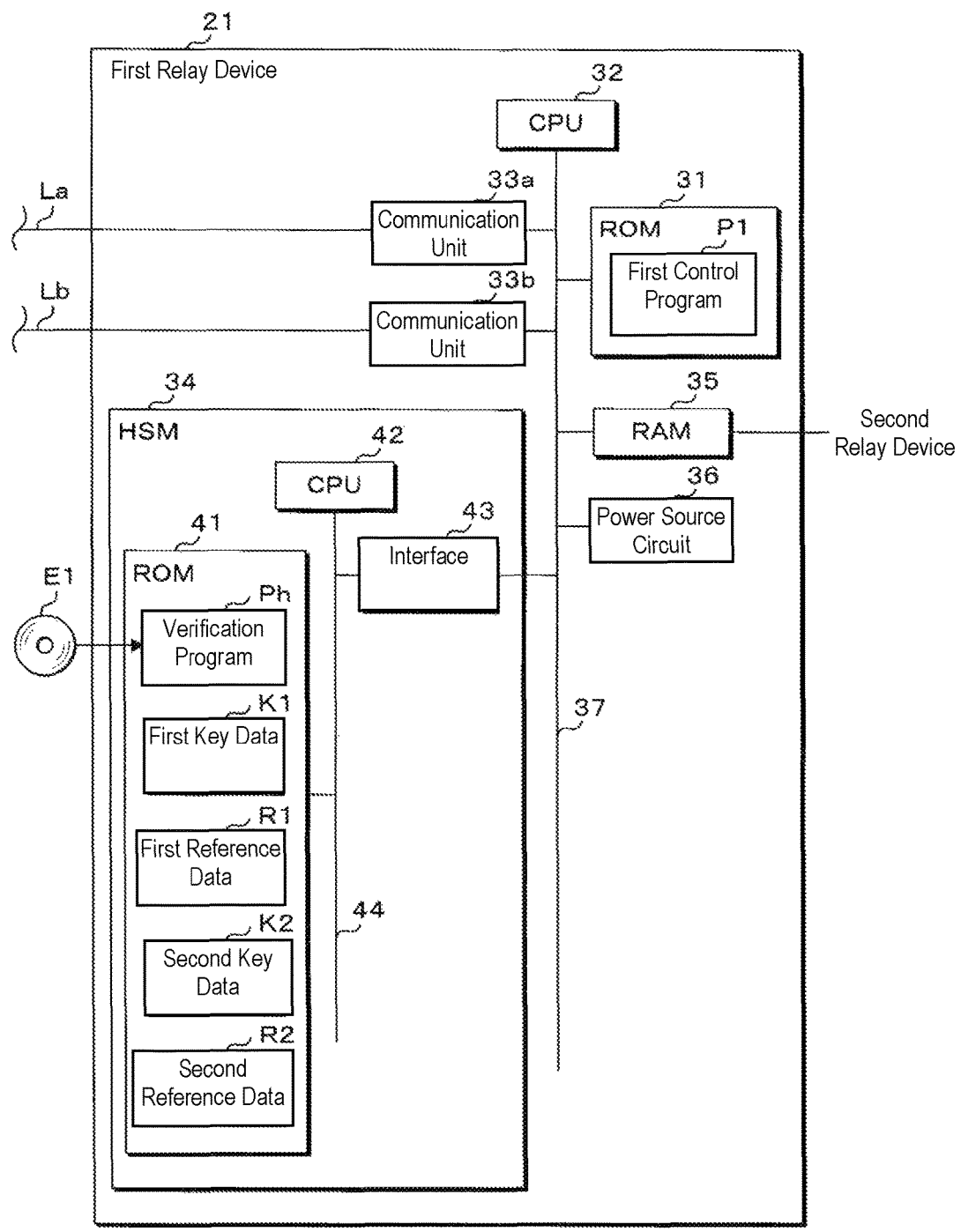
FIG. 2 is a block diagram illustrating the primary configuration of a first relay device.

FIG. 2 is a block diagram illustrating the primary configuration of the first relay device 21. The first relay device 21 includes a Read-Only Memory (ROM) 31, a CPU 32, communication units 33a and 33b, a Hardware Security Module (HSM) 34, Random Access Memory (RAM) 35, and a power source circuit 36. These are connected to a bus 37. In addition to the bus 37, the communication units 33a and 33b are connected to the communication lines La and Lb, respectively. In addition to the bus 37, the RAM 35 is connected to the second relay device 22.

A first control program P1 is stored in the ROM 31. The CPU 32 executes the first relay process in accordance with the first control program P1. The first relay process is a process for relaying communication between one of the ECUs 12a and 12a and one of the ECUs 12b and 12b, and communication between one of the ECUs 12a, 12a, 12b, and 12b and one of the vehicle-mounted devices 13a, 13b, and 13c. The first control program P1 corresponds to a second control program, and the CPU 32 functions as a processing unit. Furthermore, the CPU 32 functions as a first processing unit, and is hardware constituting the first processing unit.

The communication unit 33a receives the ECU data from one of the ECUs 12a and 12a over the communication line La. The communication unit 33a transmits the ECU data over the communication line La in accordance with instructions from the CPU 32. The ECU data transmitted by the communication unit 33a is received by the ECUs 12a and 12a.

The communication unit 33b receives the ECU data from one of the ECUs 12b and 12b over the communication line Lb. The communication unit 33b transmits the ECU data over the communication line Lb in accordance with instructions from the CPU 32. The ECU data transmitted by the communication unit 33b is received by the ECUs 12b and 12b.

A second control program P2 (see FIG. 3) is stored in the second relay device 22. The HSM 34 verifies (validates) that the first control program P1 is legitimate, and verifies that the second control program P2 is legitimate. The HSM 34 functions as a verifier that verifies the first control program P1 and the second control program P2.

Each of the CPU 32, the HSM 34, and the second relay device 22 writes various types of data into the RAM 35 and reads out data from the RAM 35. Accordingly, for example, the CPU 32 can read out, from the RAM 35, data that the second relay device 22 has written into the RAM 35.

The power source circuit 36 is connected to a battery (not illustrated) of the vehicle 100 by a power line (not illustrated). The power source circuit 36 is further connected to the ROM 31, the CPU 32, the communication units 33a and 33b, the HSM 34, and the RAM 35 by power lines (not illustrated). The power source circuit 36 transforms a voltage outputted by the battery into a predetermined first voltage. The power source circuit 36 outputs the first voltage to the ROM 31, the CPU 32, the communication units 33a and 33b, the HSM 34, and the RAM 35, and supplies power to those units.

For example, when an ignition switch (not illustrated) of the vehicle 100 has been switched on, the power source circuit 36 supplies power to the ROM 31, the CPU 32, the communication units 33a and 33b, the HSM 34, and the RAM 35, causing those units to operate. The power source circuit 36 stops the supply of power to the ROM 31, the CPU 32, the communication units 33a and 33b, the HSM 34, and the RAM 35 in accordance with instructions from the HSM 34. Accordingly, these units stop operating and data stored in the RAM 35 is deleted.

The HSM 34 includes a ROM 41, a CPU 42, and an interface 43. These are connected to a bus 44. The interface 43 is connected to the bus 37 in addition to the bus 44.

A verification program Ph is stored in the ROM 41. The CPU 42 executes the verification program Ph within the first relay device 21. As a result, a verification process for verifying that the first control program P1 and the second control program P2 are legitimate is executed. The verification program Ph is a computer program for causing the CPU 42 to execute the verification process. First key data K1, first reference data R1, second key data K2, and second reference data R2 are furthermore stored in the ROM 41. These are predetermined data and are used in the verification process. The ROM 41 functions as a storage unit and a second storage unit.

The CPU 42 is hardware for verifying the first control program P1 and the second control program P2, and is different from the CPU 32.

Note that the verification program Ph may be stored in a storage medium E1 so as to be readable by a computer (the CPU 42). In this case, the verification program Ph read out from the storage medium E1 by a readout apparatus (not illustrated) is stored in a storage unit (not illustrated) of the HSM 34. The storage medium E1 is an optical disk, a flexible disk, a magnetic disk, a magneto-optical disk, semiconductor memory, or the like. A Compact Disc Read Only Memory (CD-ROM), a Digital Versatile Disc (DVD) ROM, or a Blu-ray Disc (BD; trade name) can be given as examples of optical disks. A hard disk can be given as an example of a magnetic disk. Alternatively, the verification program Ph may be downloaded from an external device (not illustrated) connected to a communication network (not illustrated), and the verification program Ph may then be stored in the aforementioned storage unit.

The CPU 42 accesses the ROM 31 and the RAM 35 of the first relay device 21 through the interface 43. Specifically, the CPU 42 reads out the first control program P1 from the ROM 31. The CPU 42 also writes various types of data into the RAM 35 and reads out data from the RAM 35. Furthermore, the CPU 42 instructs the power source circuit 36 to stop supplying power. As described above, the interface 43 permits the CPU 42 to access the ROM 31, the RAM 35, and the power source circuit 36. On the other hand, the interface 43 prevents the CPU 32 from accessing the ROM 41. Accordingly, the CPU 32 cannot read out content stored in the ROM 41.

When the supply of power from the power source circuit 36 to the HSM 34 has been started, the CPU 42 executes the verification process. The CPU 32 of the first relay device 21 stops operating while the CPU 42 is executing the verification process. For example, the CPU 32 operates when the voltage at a terminal (not illustrated) of the CPU 32 is at a high-level voltage, and stops operating when the voltage at the terminal is at a low-level voltage. In this case, the HSM 34 holds the voltage at the terminal of the CPU 32 at the low-level voltage while the CPU 42 is executing the verification process. Then, when the CPU 42 ends the verification process, the HSM 34 switches the voltage at the terminal of the CPU 32 to the high-level voltage.

Figure 3:
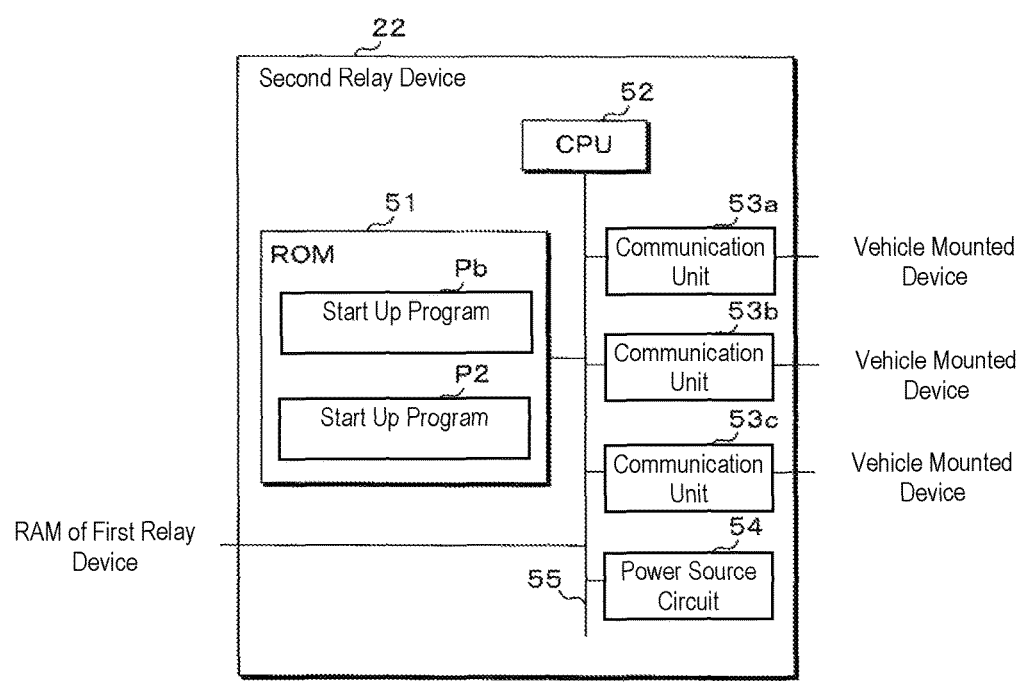
FIG. 3 is a block diagram illustrating the primary configuration of a second relay device.

FIG. 3 is a block diagram illustrating the primary configuration of the second relay device 22. The second relay device 22 includes a ROM 51, a CPU 52, communication units 53a, 53b, and 53c, and a power source circuit 54. These are connected to a bus 55. The bus 55 is furthermore connected to the RAM 35 of the first relay device 21. In addition to the bus 55, the communication units 53a, 53b, and 53c are connected to the vehicle-mounted devices 13a, 13b, and 13c, respectively.

A startup program Pb and the second control program P2 are stored in the ROM 51. The CPU 52 executes the startup process in accordance with the startup program Pb. The startup process is the first process executed by the CPU 52 after the supply of power to the CPU 52 has been started and the CPU 52 starts operating.

The CPU 52 executes the second relay process in accordance with the second control program P2. The second relay process is a process for relaying communication between two of the vehicle-mounted devices 13a, 13b, and 13c, and communication between one of the ECUs 12a, 12a, 12b, and 12b and one of the vehicle-mounted devices 13a, 13b, and 13c. The CPU 52 functions as a second processing unit.

The communication units 53a, 53b, and 53c receive device data from the vehicle-mounted devices 13a, 13b, and 13c, respectively. The communication units 53a, 53b, and 53c also transmit device data to the vehicle-mounted devices 13a, 13b, and 13c in accordance with instructions from the CPU 52.

The power source circuit 54 is connected to the battery of the vehicle 100 by a power line (not illustrated). The power source circuit 54 is further connected to the ROM 51, the CPU 52, and the communication units 53a, 53b, and 53c by power lines (not illustrated). The power source circuit 54 transforms a voltage outputted by the battery into a predetermined second voltage. The power source circuit 54 outputs the predetermined second voltage to the ROM 51, the CPU 512, the communication units 53a and 53b, the HSM 34, and the RAM 35, and supplies power to those units.

For example, when the ignition switch (not illustrated) of the vehicle 100 has been switched on, the power source circuit 54 supplies power to the ROM 51, the CPU 52, and the communication units 53a, 53b, and 53c, causing those units to operate. The power source circuit 54 stops the supply of power to the ROM 51, the CPU 52, and the communication units 53a, 53b, and 53c in accordance with instructions from the CPU 52. The operations of these units stop as a result.

In both the startup process and the second relay process, the CPU 52 writes various types of data into the RAM 35 of the first relay device 21 and reads out data from the RAM 35.

Figure 4:
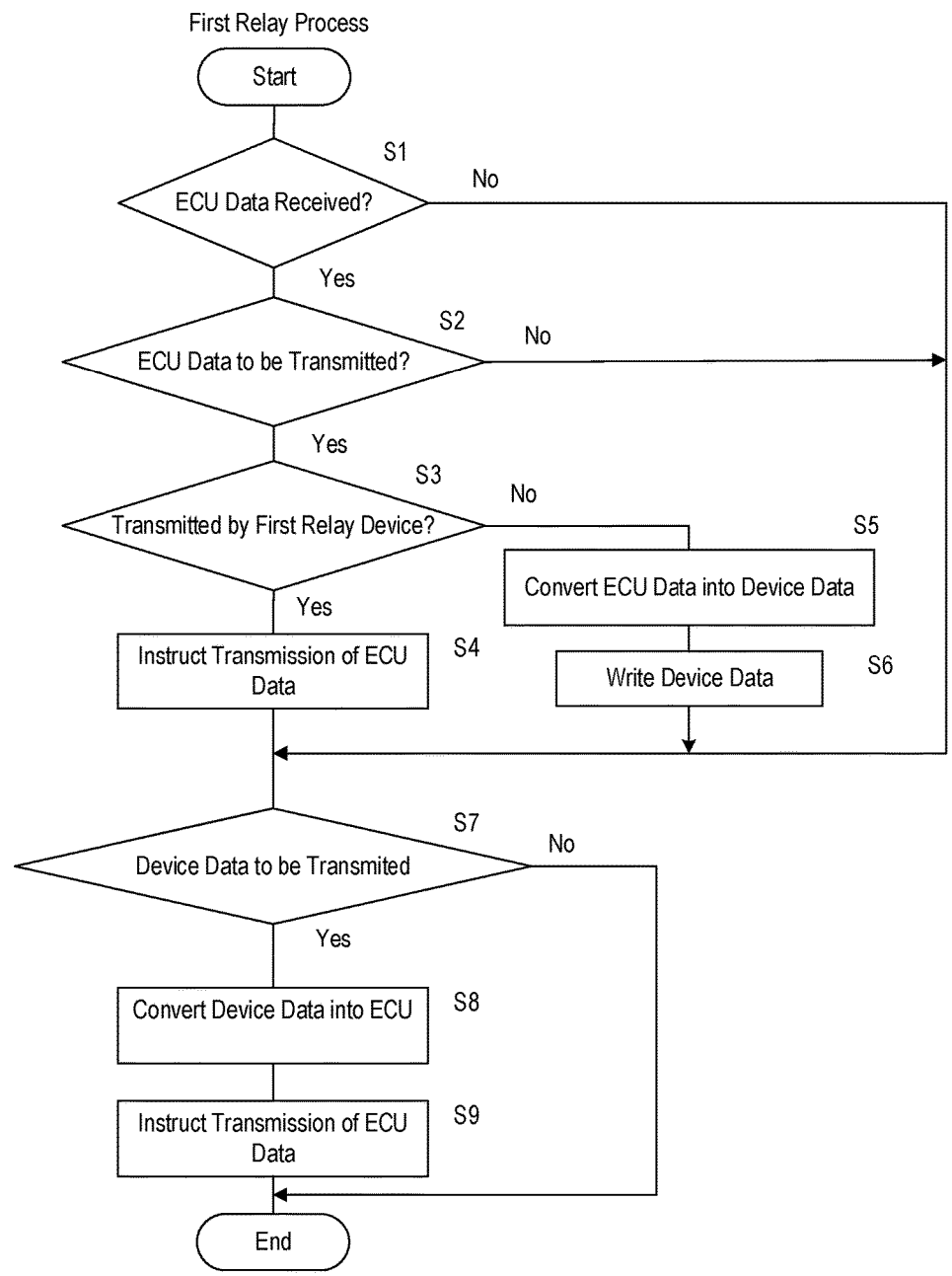
FIG. 4 is a flowchart illustrating a sequence of a first relay process.

FIG. 4 is a flowchart illustrating a sequence of the first relay process. The CPU 32 of the first relay device 21 executes the first relay process periodically. First, the CPU 32 determines whether or not one of the communication units 33a and 33b has received the ECU data (step S1). If it has been determined that one of the communication units 33a and 33b has received the ECU data (S1: YES), the CPU 32 determines whether or not the ECU data is to be transmitted to at least one of the ECUs 12a, 12a, 12b, and 12b and the vehicle-mounted devices 13a, 13b, and 13c (step S2).

A plurality of pieces of identification information are stored in the ROM 31. One of the communication units 33a and 33b is associated with each of one or more pieces of the identification information stored in the ROM 31. Transmission destination information is associated with the remaining identification information of the plurality of pieces of the identification information stored in the ROM 31. As described above, the transmission destination information indicates at least one of the vehicle-mounted devices 13a, 13b, and 13c.

In step S2, if the identification information included in the received ECU data is one of the plurality of pieces of the identification information stored in the ROM 31, the CPU 32 determines that the ECU data is to be transmitted. However, in step S2, if the identification information included in the received ECU data does not match any of the plurality of pieces of the identification information stored in the ROM 31, the CPU 32 determines that the ECU data is not to be transmitted.

If it has been determined that the ECU data is to be transmitted (S2: YES), the CPU 32 determines whether or not the first relay device 21 is to transmit the received ECU data (step S3). Here, if, in the ROM 31, one of the communication units 33a and 33b is associated with the identification information included in the received ECU data, the CPU 32 determines that the first relay device 21 is to transmit the received ECU data. However, if, in the ROM 31, transmission destination information is associated with the identification information included in the received ECU data, the CPU 32 determines that the first relay device 21 is not to transmit the received ECU data.

If it has been determined that the first relay device 21 is to transmit the received ECU data (S3: YES), the CPU 32 instructs the one of the communication units 33a and 33b corresponding to the identification information included in the received ECU data to transmit the received ECU data (step S4). As a result, the one of the communication units 33a and 33b instructed to transmit the received ECU data transmits the received ECU data.

For example, if, when the communication unit 33a has received the ECU data from one of the ECUs 12a and 12a, the identification information included in the ECU data received by the communication unit 33a is associated with the communication unit 33b, the CPU 32 instructs the communication unit 33b to transmit the ECU data received by the communication unit 33a. This ECU data is received by the ECUs 12b and 12b.

Thus as described above, the first relay device 21 relays communication between one of the ECUs 12a and 12a and one of the ECUs 12b and 12b.

If it is determined that the first relay device 21 is not to transmit the received ECU data, or in other words, that the second relay device 22 is to transmit the received ECU data (S3: NO), the CPU 32 converts the received ECU data into the device data (step S5). The device data converted in step S5 includes the transmission destination information corresponding to the identification information included in the received ECU data. The transmission destination information indicates at least one of the vehicle-mounted devices 13a, 13b, and 13c. Next, the CPU 32 writes the device data converted in step S5 into the RAM 35 (step S6). As described above, the CPU 52 of the second relay device 22 can read out the device data from the RAM 35.

If it has been determined that neither of the communication units 33a and 33b have received the ECU data (S1: NO), that the ECU data is not to be transmitted (S2: NO), or after one of steps S4 and S6 has been carried out, the CPU 32 determines whether or not one of the communication units 33a and 33b is to transmit the device data stored in the RAM 35 (step S7). Here, if device data in which the transmission destination information indicates at least one of the ECUs 12a, 12a, 12b, and 12b is stored in the RAM 35, the CPU 32 determines that one of the communication units 33a and 33b is to transmit the device data. However, if device data in which the transmission destination information indicates at least one of the ECUs 12a, 12a, 12b, and 12b is not stored in the RAM 35, the CPU 32 determines that neither of the communication units 33a and 33b is to transmit the device data.

If it has been determined that the device data is to be transmitted (S7: YES), the CPU 32 converts the device data to be transmitted into ECU data (step S8). The ECU data converted in step S8 includes the identification information corresponding to the transmission destination information. For example, the identification information is stored in the ROM 31 in association with each of a plurality of pieces of the transmission destination information, and the identification information associated with the transmission destination information is included in the ECU data. For example, a single piece of identification information is associated with the transmission destination information indicating one of the ECUs 12a and 12a, and another piece of identification information is associated with the transmission destination information indicating one of the ECUs 12a and 12a and one of the ECUs 12b and 12b. The CPU 32 also functions as a conversion unit.

Next, the CPU 32 instructs at least one of the communication units 33a and 33b to transmit the ECU data converted in step S8 (step S9). As a result, at least one of the communication units 33a and 33b transmits the ECU data converted by the CPU 32 in step S8. For example, if device data in which the transmission destination is one of the ECUs 12a and 12a has been converted in step S8, the CPU 32 instructs the communication unit 33a to transmit the ECU data converted in step S8.

If it has been determined that neither of the communication units 33a and 33b are to transmit the device data (S7: NO), or after step S9 has been carried out, the CPU 32 ends the first relay process.

Figure 5:
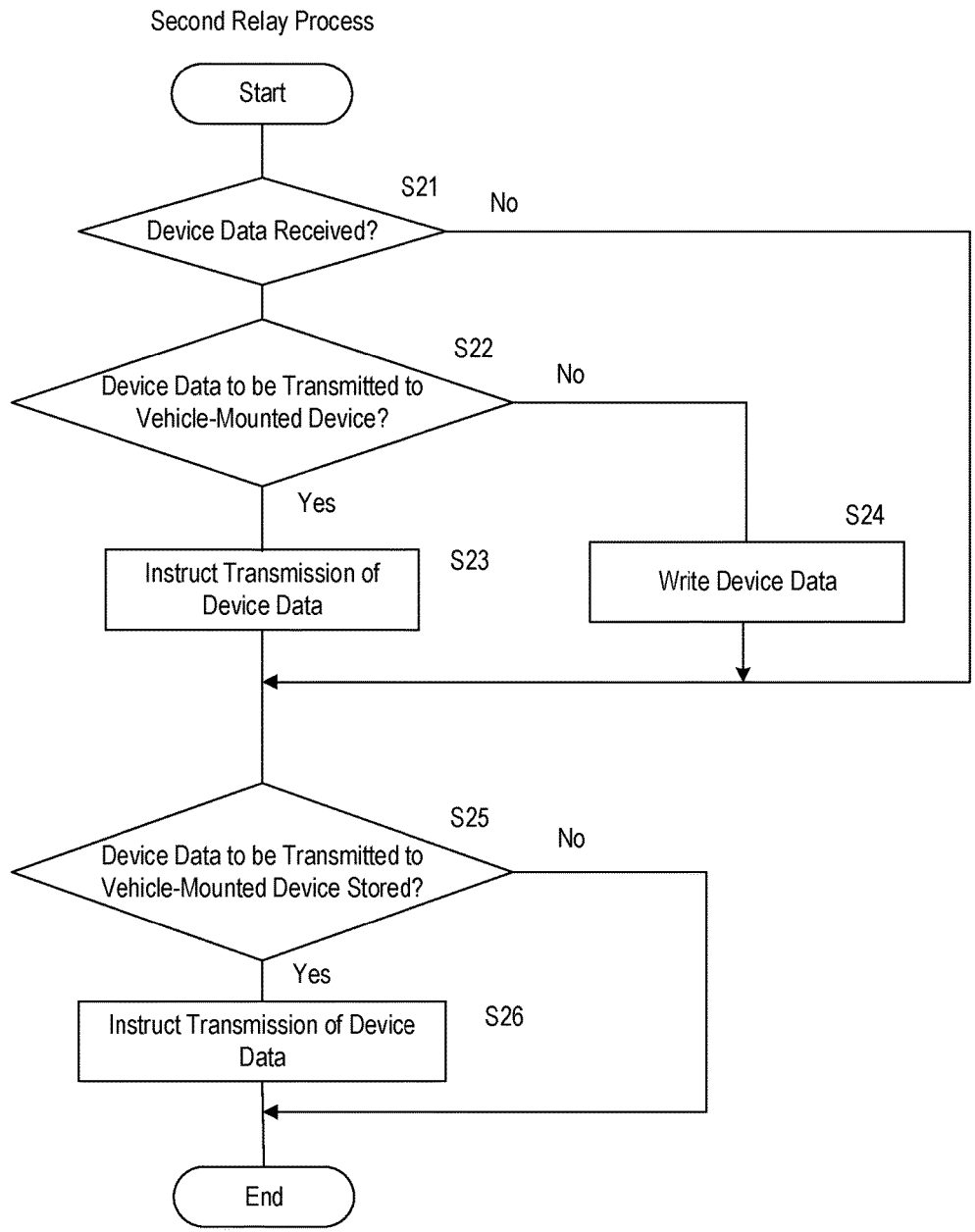
FIG. 5 is a flowchart illustrating a sequence of a second relay process.

FIG. 5 is a flowchart illustrating a sequence of the second relay process. The CPU 52 of the second relay device 22 executes the second relay process periodically. First, the CPU 52 determines whether or not one of the communication units 53a, 53b, and 53c has received the device data (step S21). If it has been determined that one of the communication units 53a, 53b, and 53c has received the device data (S21: YES), the CPU 32 determines whether or not the received device data is to be transmitted to at least one of the vehicle-mounted devices 13a, 13b, and 13c (step S22).

Here, if the transmission destination information included in the received device data indicates at least one of the vehicle-mounted devices 13a, 13b, and 13c, the CPU 52 determines that the received device data is to be transmitted to at least one of the vehicle-mounted devices 13a, 13b, and 13c. However, if the transmission destination information included in the received device data does not indicate any of the vehicle-mounted devices 13a, 13b, and 13c, the CPU 52 determines that the received device data is not to be transmitted to any of the vehicle-mounted devices 13a, 13b, and 13c.

If it has been determined that the received device data is to be transmitted to at least one of the vehicle-mounted devices 13a, 13b, and 13c (S22: YES), the CPU 52 instructs at least one of the communication units 53a, 53b, and 53c to transmit the device data (step S23). The vehicle-mounted devices 13a, 13b, and 13c correspond to the communication units 53a, 53b, and 53c, respectively. In step S23, the communication unit instructed to make the transmission is determined in accordance with the transmission destination indicated by the transmission destination information included in the received device data. For example, if the transmission destination information indicates the vehicle-mounted devices 13b and 13c, the CPU 52 instructs the communication units 53b and 53c to transmit the received device data. When the CPU 52 has executed step S23, the one of the communication units 53a, 53b, and 53c instructed to make the transmission transmits the device data.

For example, if, when the communication unit 53a has received the device data, the transmission destination information included in the device data received by the communication unit 53a indicates the vehicle-mounted device 13b, the CPU 52 instructs the communication unit 53b to transmit the device data received by the communication unit 53a.

In this manner, the second relay device 22 relays the communication between two of the vehicle-mounted devices 13a, 13b, and 13c.

If it has been determined that the received device data is not to be transmitted to any of the vehicle-mounted devices 13a, 13b, and 13c, or in other words, that the received device data is to be transmitted to at least one of the ECUs 12a, 12a, 12b, and 12b (S22: NO), the CPU 52 writes the received device data into the RAM 35 of the first relay device 21 (step S24).

If it has been determined that none of the communication units 53a, 53b, and 53c have received the device data (S21: NO), or after steps S23 and S24 have been carried out, the CPU 52 determines whether or not the device data to be transmitted to at least one of the vehicle-mounted devices 13a, 13b, and 13c is stored in the RAM 35 (step S25). Here, if device data in which the transmission destination information indicates at least one of the vehicle-mounted devices 13a, 13b, and 13c is stored in the RAM 35, the CPU 52 determines that device data to be transmitted is stored. However, if device data in which the transmission destination information indicates at least one of the vehicle-mounted devices 13a, 13b, and 13c is not stored in the RAM 35, the CPU 52 determines that device data to be transmitted is not stored.

If it has been determined that the device data to be transmitted is stored (S25: YES), the CPU 52 instructs at least one of the communication units 53a, 53b, and 53c to transmit the device data (step S26). Like in step S23, in step S26, the communication unit instructed to make the transmission is determined in accordance with the transmission destination indicated by the transmission destination information included in the device data to be transmitted.

If it has been determined that no device data to be transmitted is stored (S25: NO), or after step S26 has been carried out, the CPU 52 ends the second relay process.

According to the relay apparatus 11 configured as described above, the ECU data transmitted by one of the ECUs 12a, 12a, 12b, and 12b is converted into device data, and the converted device data is transmitted to at least one of the vehicle-mounted devices 13a, 13b, and 13c. The device data transmitted by one of the vehicle-mounted devices 13a, 13b, and 13c is converted into ECU data, and the converted ECU data is transmitted to at least one of the ECUs 12a, 12a, 12b, and 12b.

Figure 6:
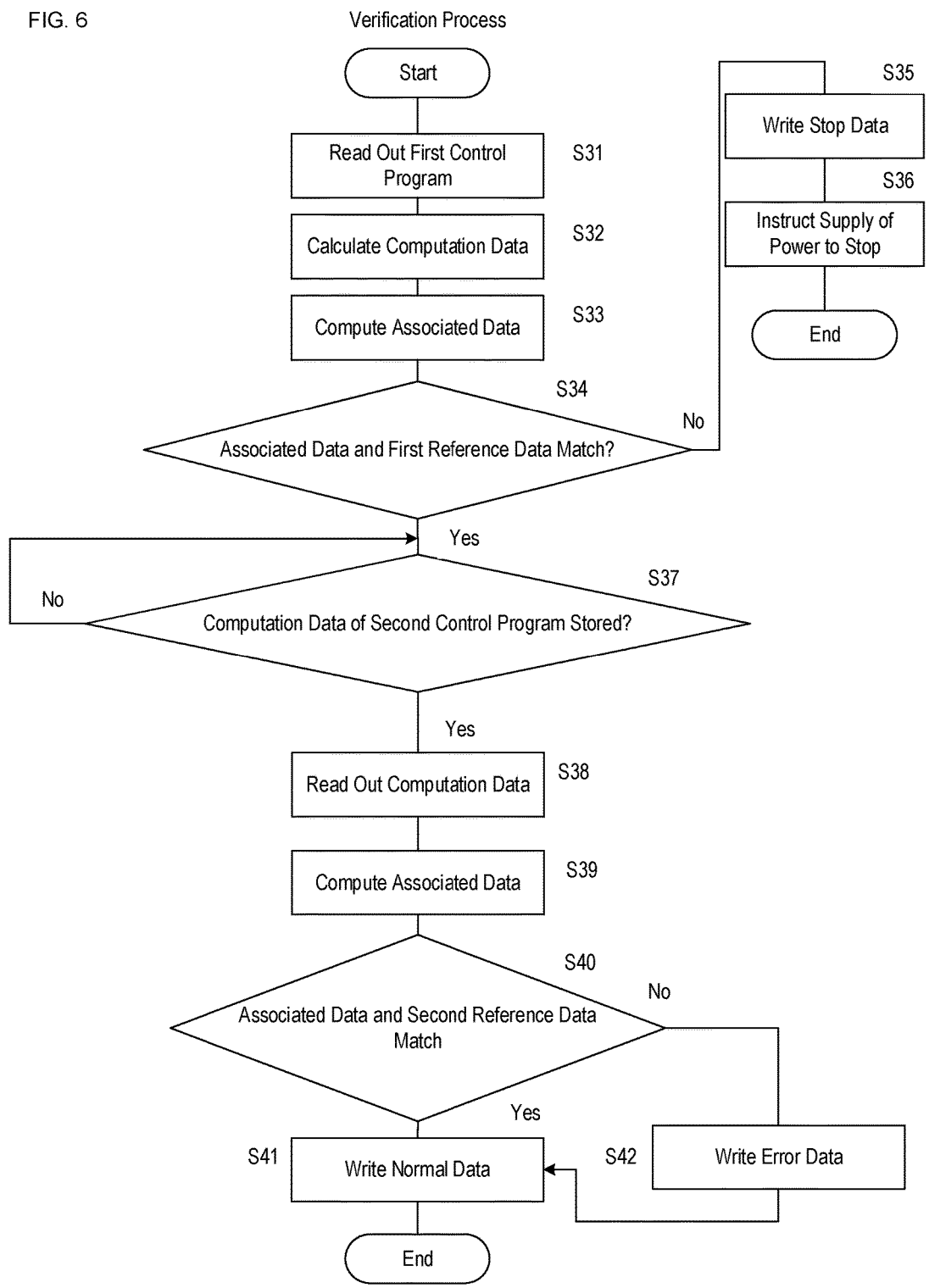
FIG. 6 is a flowchart illustrating a sequence of a verification process.

FIG. 6 is a flowchart illustrating a sequence of a verification process. When the power source circuit 54 has started supplying power to the CPU 42 of the HSM 34 in the first relay device 21, the CPU 42 executes the verification process before executing the first relay process. As described above, the CPU 32 stops operating while the CPU 42 is executing the verification process. In the verification process, first, the CPU 42 reads out the first control program P1 from the ROM 31 (step S31). Next, the CPU 42 uses, for example, a hash function to calculate computation data for computing associated data pertaining to the first control program P1 (step S32). In step S32, the CPU 42 calculates the computation data on the basis of the first control program P1 read out in step S31.

Next, the CPU 42 computes the associated data associated with the first control program P1 using the computation data calculated in step S32 and the first key data K1 stored in the ROM 41 (step S33). The first key data K1 corresponds to second key data, and the CPU 42 functions as a second computation unit.

Next, the CPU 42 determines whether or not the associated data computed in step S33 matches the first reference data R1 stored in the ROM 41 in advance (step S34). The CPU 42 also functions as a second determination unit.

The CPU 42 verifies the first control program P1 as legitimate by carrying out step S34. The associated data pertaining to the first control program P1 matching the first reference data R1 means that the first control program P1 is legitimate. The associated data pertaining to the first control program P1 not matching the first reference data R1 means that the first control program P1 is not legitimate, or in other words, that the first control program P1 has likely been tampered with.

If it has been determined that the associated data does not match the first reference data R1 (S34: NO), the CPU 42 writes stop data, instructing the power source circuit 54 of the second relay device 22 to stop the supply of power, into the RAM 35 (step S35). This makes it possible to notify the CPU 52 of the second relay device 22 that the first control program P1 is not legitimate. The CPU 42 then instructs the power source circuit 36 to stop supplying power (step S36). As a result, the power source circuit 36 stops supplying power to the ROM 31, the CPU 32, the communication units 33a and 33b, the HSM 34, and the RAM 35, and the first relay device 21 stops operating. After carrying out step S36, the CPU 42 ends the verification process.

As described earlier, the data stored in the RAM 35 is deleted when the power source circuit 36 stops supplying power to the RAM 35. To secure time for the CPU 52 of the second relay device 22 to read out the stop data stored in the RAM 35, the CPU 42 carries out step S35 and then carries out step S36 after a predetermined amount of time sufficient for the CPU 52 to read out the stop data has passed.

If it has been determined that the associated data matches the first reference data R1 (S34: YES), the CPU 42 determines whether or not the computation data of the second control program P2 of the second relay device 22 is stored in the RAM 35 (step S37). The computation data of the second control program P2 is data for computing associated data pertaining to the second control program P2. If it has been determined that the computation data is not stored (S37: NO), the CPU 42 carries out step S37 again and stands by until the computation data is written into the RAM 35. The CPU 52 of the second relay device 22 calculates the computation data of the second control program P2 in the startup process and writes the calculated computation data into the RAM 35.

If it has been determined that the computation data is stored (S37: YES), the CPU 42 reads out the computation data of the second control program P2 from the RAM 35 (step S38), and using the read-out computation data and the second key data K2 stored in the ROM 41, computes the associated data pertaining to the second control program P2 (step S39). The CPU 42 functions as a computation unit and an associated data computation unit.

Next, the CPU 42 determines whether or not the associated data computed in step S39 matches the second reference data R2 stored in the ROM 41 in advance (step S40). The CPU 42 also functions as a determination unit.

The CPU 42 also verifies the second control program P2 as legitimate by carrying out step S40. If it has been determined that the associated data matches the second reference data R2 (S40: YES), the CPU 42 writes normal data, indicating that the second control program P2 is legitimate, into the RAM 35 (step S41). This makes it possible to notify the CPU 52 of the second relay device 22 that the second control program P2 is legitimate.

If it has been determined that the associated data does not match the second reference data R2 (S40: NO), the CPU 42 writes error data, indicating that the second control program P2 is not legitimate, or in other words, that the second control program P2 has likely been tampered with, into the RAM 35 (step S42). This makes it possible to notify the CPU 52 of the second relay device 22 that the second control program P2 is not legitimate.

After carrying out one of steps S41 and S42, the CPU 42 ends the verification process. After the CPU 42 ends the verification process, the power source circuit 36 temporarily stops the supply of power, and the operations are stopped until the supply of power is restarted. After the CPU 42 has ended the verification process, the CPU 32 executes the legitimate first control program P1. Note that as described earlier, the interface 43 prevents the CPU 32 from accessing the ROM 41. As such, the verification program Ph, the first key data K1, the first reference data R1, the second key data K2, and the second reference data R2 cannot be taken out of the HSM 34.

Figure 7:
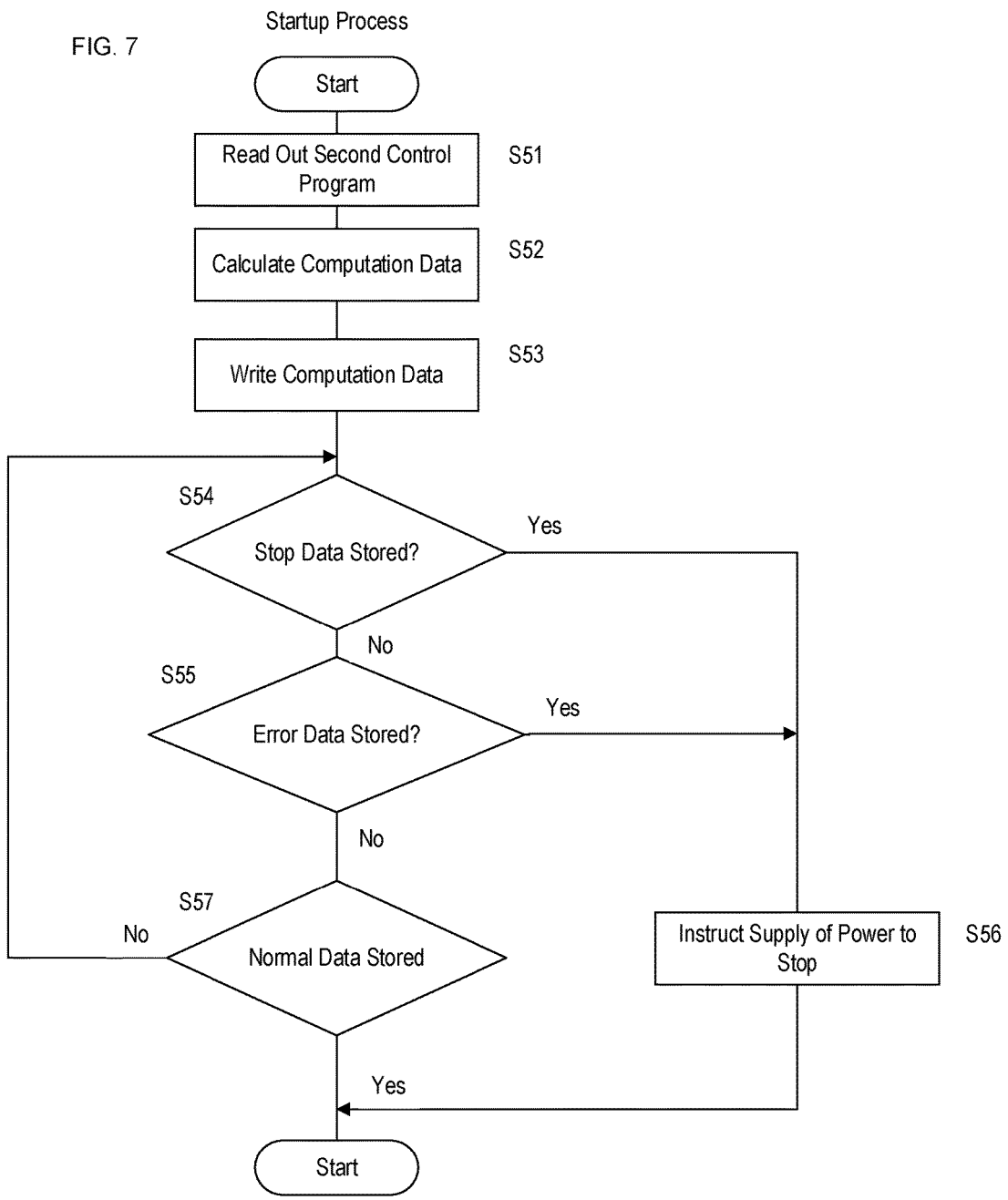
FIG. 7 is a flowchart illustrating a sequence of a startup process.

FIG. 7 is a flowchart illustrating a sequence of the startup process. When the power source circuit 54 has started supplying power to the CPU 52 of the second relay device 22, the CPU 52 executes the startup process in accordance with the startup program Pb before executing the second relay process. In the startup process, first, the CPU 52 reads out the second control program P2 from the ROM 51 (step S51). Next, the CPU 52 uses, for example, a hash function to calculate computation data for computing associated data pertaining to the second control program P2 (step S52). The CPU 52 functions as a calculation unit. In step S52, the CPU 52 calculates the computation data on the basis of the second control program P2 read out in step S51.

Next, the CPU 52 writes the computation data calculated in step S52 into the RAM 35 of the first relay device 21 (step S53). As described above, the CPU 42 of the HSM 34 in the first relay device 21 reads out the computation data stored in the RAM 35, computes the associated data pertaining to the second control program P2 using the read-out computation data, and verifies whether or not the second control program P2 is legitimate. In the verification process, the CPU 42 writes the stop data, the error data, or the normal data into the RAM 35.

Reading out the associated data from the RAM 35 corresponds to obtaining the associated data. Thus the CPU 42 also functions as an obtainment unit.

Note that the power source circuit 36 of the first relay device 21 and the power source circuit 54 of the second relay device 22 start supplying power at substantially the same time, and the CPU 52 carries out step S53 after the power source circuit 36 of the first relay device 21 has started the supply of power. As such, the CPU 52 can reliably write the computation data into the RAM 35.

After carrying out step S53, the CPU 52 determines whether or not the stop data is stored in the RAM 35 of the first relay device 21 (step S54). If it has been determined that the stop data is not stored (S54: NO), the CPU 52 determines whether or not error data is stored in the RAM 35 (step S55). If it has been determined that the stop data is stored (S54: YES), or if it has been determined that the error data is stored (S55: YES), the CPU 52 instructs the power source circuit 54 to stop the supply of power (step S56). As a result, the power source circuit 54 stops the supply of power, and the ROM 51, the CPU 52, and the communication units 53a, 53b, and 53c stop operating. After carrying out step S56, the CPU 52 ends the startup process.

As described thus far, the CPU 42 of the HSM 34 in the first relay device 21 stops the operation of the CPU 42, or in other words, the operation of the second relay device 22, by writing the stop data or the error data into the RAM 35. The CPU 42 also functions as an operation control unit.

As described earlier, if it has been determined that the associated data pertaining to the first control program P1 does not match the first reference data R1, it is likely that the first control program P1 has been tampered with, and thus the CPU 42 writes the stop data into the RAM 35.

Additionally, if it has been determined that the associated data pertaining to the second control program P2 does not match the second reference data R2, it is likely that the second control program P2 has been tampered with, and thus the CPU 42 writes the error data into the RAM 35. The operation of the second relay device 22 is stopped as a result.

If the CPU 52 has determined in step S55 that the error data is stored and has then carried out step S56, the power source circuit 36 of the first relay device 21 does not stop the supply of power, and the CPU 32 of the first relay device 21 executes the first relay process. Thus although the operation of the second relay device 22 stops, the first relay device 21 relays the communication between one of the ECUs 12a and 12a and one of the ECUs 12b and 12b.

For example, assume that the ECUs 12a, 12a, 12b, and 12b control electric devices providing the minimum functions necessary for driving the vehicle 100, such as headlights or wiper motors, and the vehicle-mounted devices 13a, 13b, and 13c are devices not absolutely necessary when driving the vehicle 100, such as a camera, a display, and so on. In this case, if the first control program P1 is legitimate, a driver can still drive the vehicle 100 even if the second control program P2 is not legitimate.

If it has been determined that the error data is not stored (S55: NO), the CPU 52 determines whether or not normal data is stored in the RAM 35 of the first relay device 21 (step S57). If it has been determined that the normal data is not stored (S57: NO), the CPU 52 carries out step S54, and stands by until stop data, error data, or normal data is stored in the RAM 35.

Note that if the CPU 42 of the HSM 34 in the first relay device 21 has carried out step S36 of the verification process before the CPU 52 carries out step S54, no data is stored in the RAM 35, and thus the CPU 52 will endlessly repeat the determinations of steps S54, S55, and S57. Thus in the startup process, if the time for which the CPU 52 repeats the determinations of steps S54, S55, and S57 has exceeded a second predetermined amount of time, step S56 may be carried out assuming the first control program P1 is not legitimate.

If it has been determined that the normal data is stored (S57: YES), the CPU 52 ends the startup process. The CPU 52 then executes the second relay process.

According to the relay apparatus 11 configured as described thus far, the CPU 32 of the HSM 34 in the first relay device 21 verifies that the second control program P2 is legitimate. Accordingly, it is not necessary provide the second relay device 22 with the same constituent elements as the HSM 34, which has the verification function. The relay apparatus 11 is therefore small and inexpensive to produce.

Additionally, the CPU 52 of the second relay device 22 calculates the computation data of the second control program P2 and writes the calculated computation data into the RAM 35 of the first relay device 21. The size of the computation data of the second control program P2 is smaller than the size of the second control program P2. As such, only a small amount of data is transferred from the second relay device 22 to the first relay device 21 in order to verify that the second control program P2 is legitimate. As a result, only a short amount of time is required for the verification.

Second Embodiment

Figure 8:
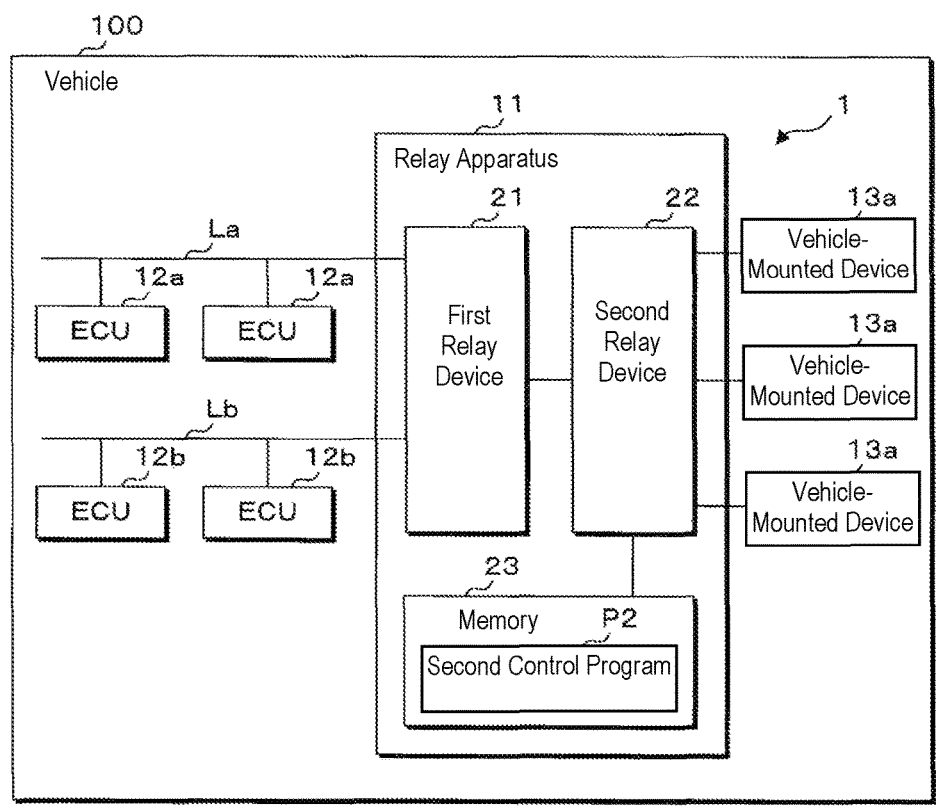
FIG. 8 is a block diagram illustrating the primary configuration of a communication system according to a second embodiment.

FIG. 8 is a block diagram illustrating the primary configuration of a communication system 1 according to a second embodiment.

Hereinafter, points of the second embodiment that are different from the first embodiment will be described. Configurations aside from those described hereinafter are the same as in the first embodiment. As such, constituent elements that are the same as in the first embodiment will be given the same reference signs as in the first embodiment, and descriptions thereof will be omitted.

The communication system 1 according to the second embodiment differs from the communication system 1 according to the first embodiment in that the configuration of the relay apparatus 11 is different. The relay apparatus 11 according to the second embodiment includes memory 23 in addition to the first relay device 21 and the second relay device 22. The memory 23 is connected to the second relay device 22. The memory 23 is non-volatile memory. The second control program P2 is stored in the memory 23. The second control program P2 is read out from the memory 23 by the second relay device 22.

Figure 9:
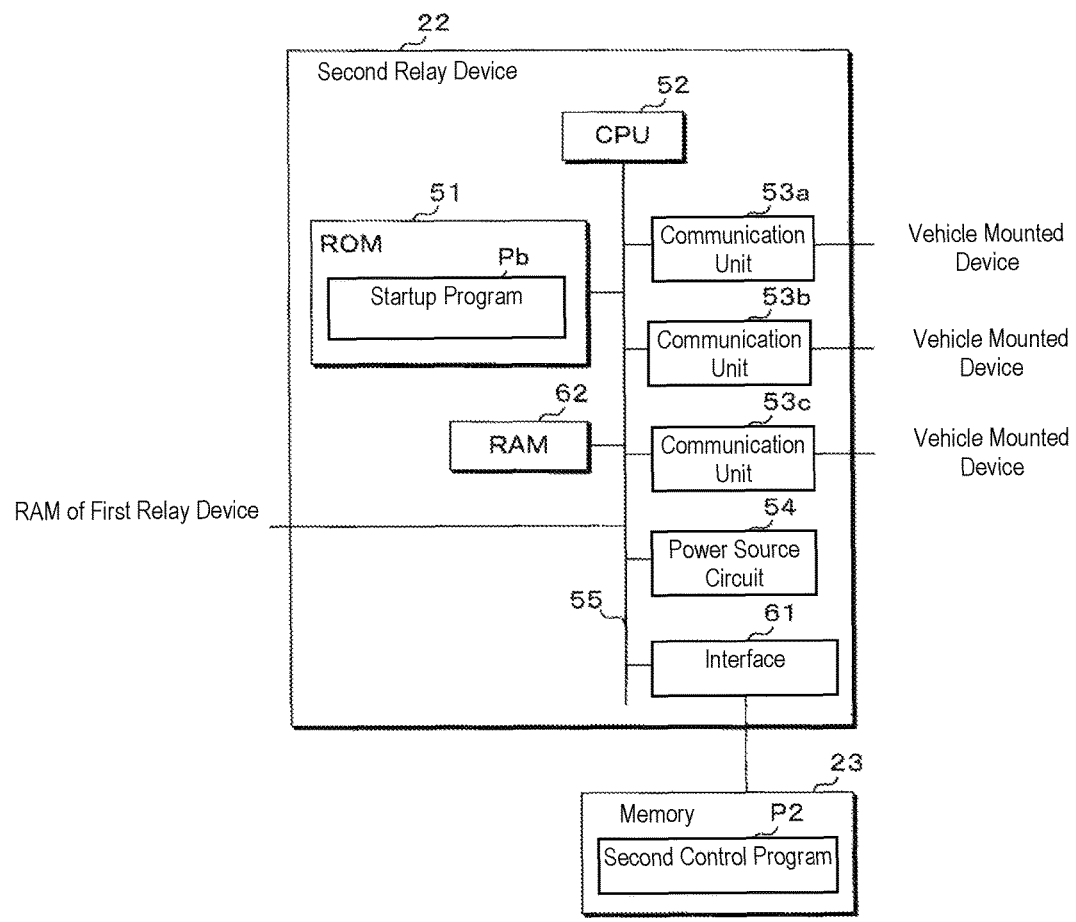
FIG. 9 is a block diagram illustrating the primary configuration of a second relay device.

FIG. 9 is a block diagram illustrating the primary configuration of the second relay device 22. In addition to the constituent elements of the second relay device 22 according to the first embodiment, the second relay device 22 according to the second embodiment includes an interface 61 and a RAM 62. The interface 61 and the RAM 62 are also connected to the bus 55. The interface 61 is furthermore connected to the memory 23.

The CPU 52 reads out the second control program P2 from the memory 23 through the interface 61. The CPU 52 also writes various types of data into the RAM 62 and reads out data from the RAM 62.

Note that in the second embodiment, the second control program P2 is stored in the ROM 51.

The power source circuit 54 supplies power to the interface 61 and the RAM 62 in addition to the ROM 51, the CPU 52, and the communication units 53a, 53b, and 53c. The interface 61 and the RAM 62 operate while being supplied with power from the power source circuit 54. The data stored in the RAM 62 is deleted when the power source circuit 54 stops supplying power to the RAM 62.

Figure 10:
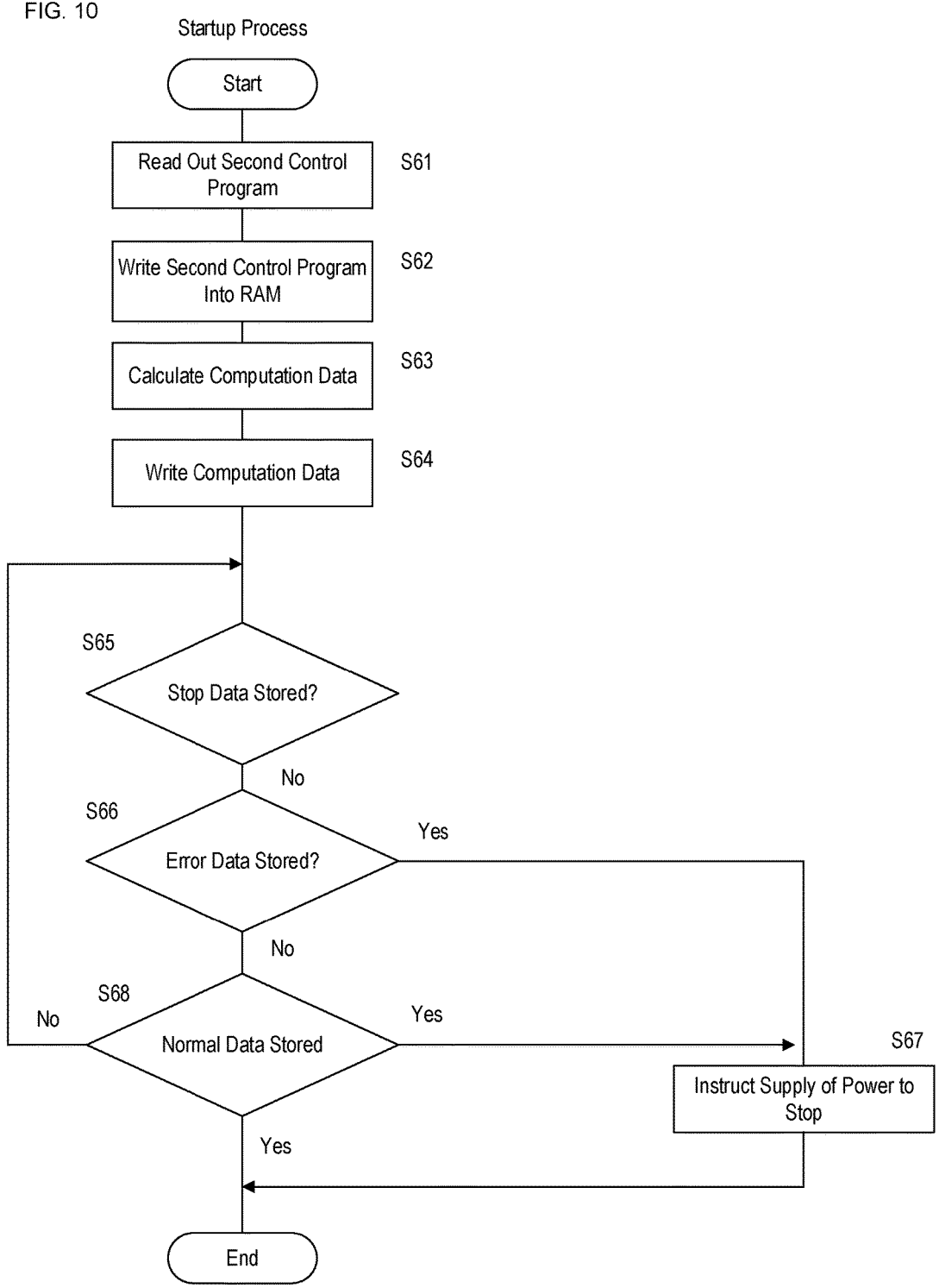
FIG. 10 is a flowchart illustrating a sequence of a startup process.

FIG. 10 is a flowchart illustrating a sequence of a startup process. In the second embodiment as well, when the power source circuit 54 has started supplying power to the CPU 52 of the second relay device 22, the CPU 52 executes the startup process in accordance with the startup program Pb before executing the second relay process. Steps S65 to S68 of the startup process according to the second embodiment are the same as steps S54 to S57 of the startup process according to the first embodiment. Accordingly, steps S65 to S68 will not be described in detail.

In the startup process according to the second embodiment, the CPU 52 first reads out the second control program P2 from the memory 23 via the interface 61 (step S61), and then writes the read-out second control program P2 into the RAM 62 (step S62). Next, the CPU 52 uses, for example, a hash function to calculate computation data for computing associated data pertaining to the second control program P2 (step S63).

Next, the CPU 52 writes the computation data calculated in step S64 into the RAM 35 of the first relay device 21 (step S64), and then carries out step S65.

As in the first embodiment, if it has been determined in step S68 that normal data is stored in the RAM 35 of the first relay device 21 and the startup process has been ended, the CPU 52 executes the second relay process in accordance with the second control program P2 stored in the RAM 62 of the second relay device 22.

The relay apparatus 11 according to the second embodiment as described thus far provides the same effects as those provided by the relay apparatus 11 according to the first embodiment.

Third Embodiment

Figure 11:
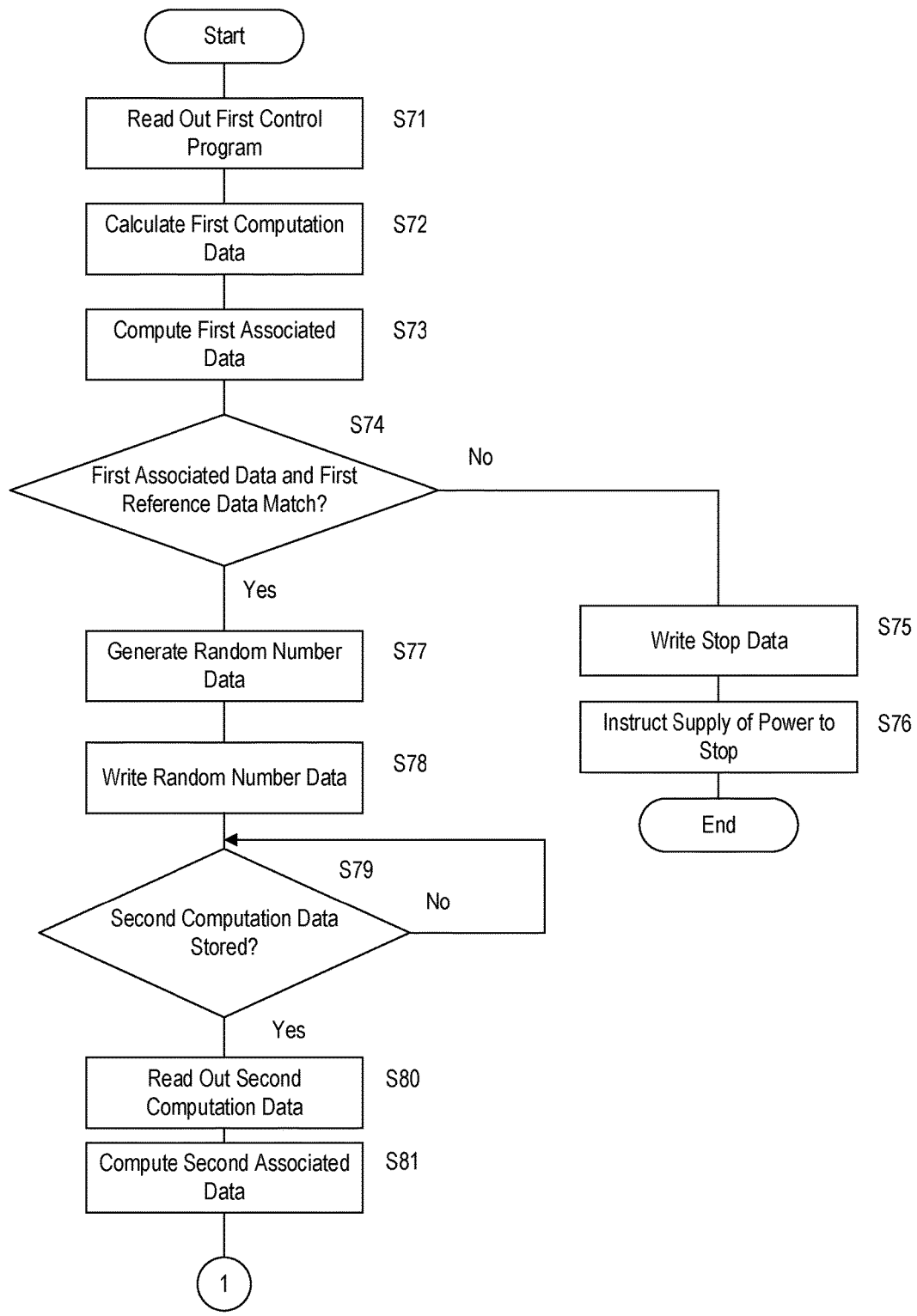
FIG. 11 is a flowchart illustrating a sequence of a verification process according to a third embodiment.
Figure 12:
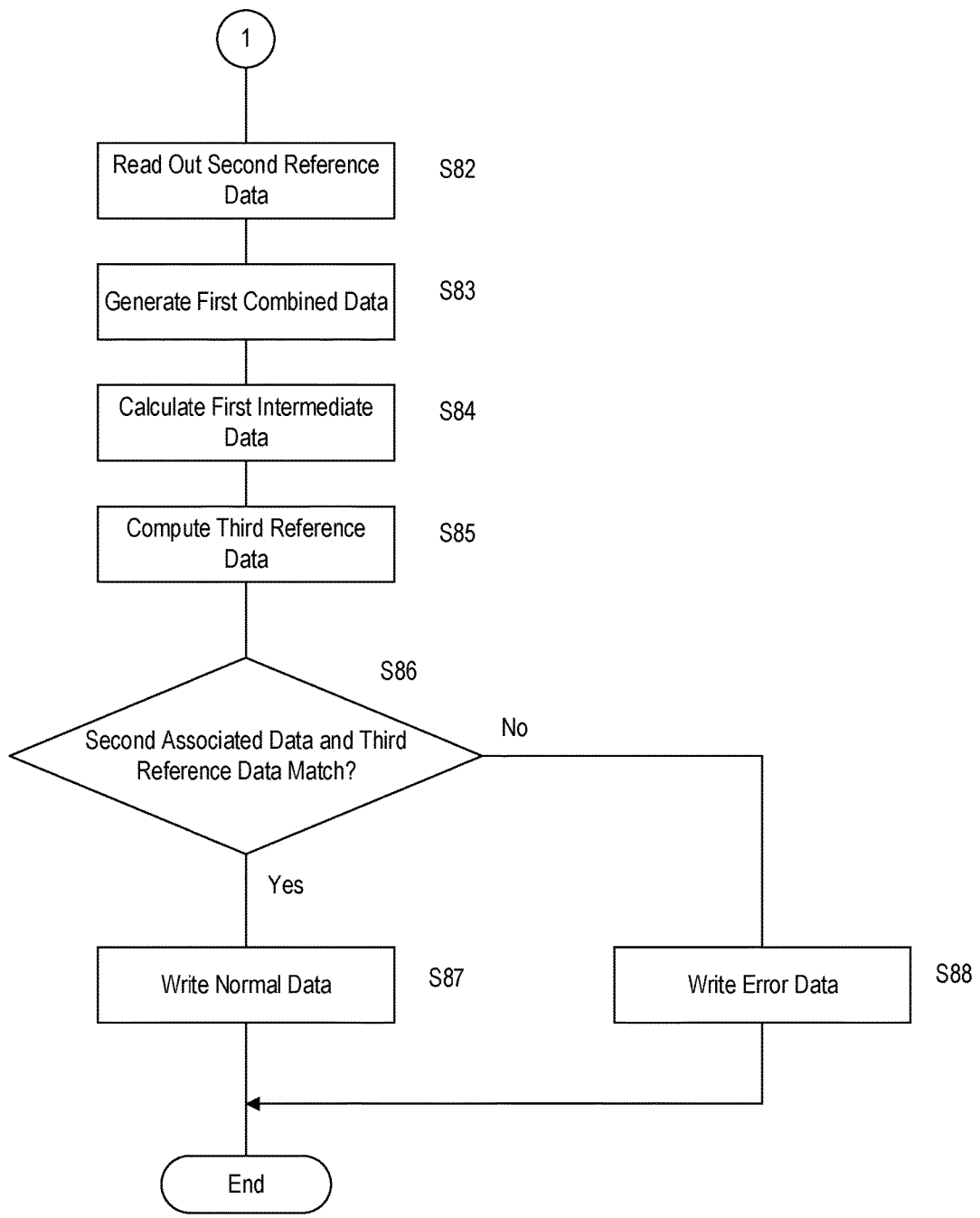
FIG. 12 is a flowchart illustrating a sequence of the verification process according to the third embodiment.

FIGS. 11 and 12 are flowcharts illustrating a sequence of a verification process according to a third embodiment.

Hereinafter, points of the third embodiment that are different from the first embodiment will be described. Configurations aside from those described hereinafter are the same as in the first embodiment. As such, constituent elements that are the same as in the first embodiment will be given the same reference signs as in the first embodiment, and descriptions thereof will be omitted.

The communication system 1 according to the third embodiment differs from the communication system 1 according to the first embodiment in that the details of the verification process executed by the CPU 42 of the HSM 34 in the first relay device 21 are different and the details of the startup process executed by the CPU 52 of the second relay device 22 are different.

As in the first embodiment, when the power source circuit 54 has started supplying power to the CPU 42 of the HSM 34, the CPU 42 executes the verification process before executing the first relay process. The CPU 32 stops operating while the CPU 42 is executing the verification process. Steps S75, S76, S87, and S88 of the verification process according to the third embodiment are the same as steps S35, S36, S41, and S42 of the verification process according to the first embodiment. Accordingly, steps S75, S76, S87, and S88 will not be described in detail.

In the verification process according to the third embodiment, first, the CPU 42 reads out the first control program P1 from the ROM 31 (step S71), and then on the basis of the read-out first control program P1, calculates first computation data for computing first associated data pertaining to the first control program P1 (step S72). In step S72, the CPU 42 calculates the first computation data using a hash function, for example.

Next, on the basis of the first computation data calculated in step S72 and the first key data K1 stored in the ROM 41, the CPU 42 computes the first associated data pertaining to the first control program P1 (step S73), and determines whether or not the computed first associated data matches the first reference data R1 (step S74). The CPU 42 verifies the first control program P1 as legitimate by carrying out step S74. The first associated data matching the first reference data R1 means that the first control program P1 is legitimate. The first associated data not matching the first reference data R1 means that the first control program P1 is not legitimate, or in other words, that the first control program P1 has likely been tampered with.

If it has been determined that the first associated data does not match the first reference data R1 (S74: NO), the CPU 42 carries out steps S75 and S76 in order. As a result, the power source circuit 36 stops supplying power to the ROM 31, the CPU 32, the communication units 33*a* and 33*b*, the HSM 34, and the RAM 35, and the first relay device 21 stops operating. After carrying out step S76, the CPU 42 ends the verification process.

If it has been determined that the first associated data matches the first reference data R1 (S74: YES), the CPU 42 generates random number data (step S77). The random number data is a string of numerical values of 1s and 0s, expressing a random number. In step S77, the CPU 42 determines an initial value, and generates the random number data on the basis of the determined initial value. The CPU 42 determines the initial value on the basis of the time at which step S77 has been executed, for example. In this case, different random number data is generated in step S77 depending on the time at which step S77 is executed. The time also includes the year, month, and day.

As described earlier, the verification process is executed each time the power source circuit 54 starts supplying power to the CPU 42. The time at which step S77 is executed will be different in each of the verification processes executed repeatedly. The initial values determined on the basis of those times will therefore also differ from each other. As a result, if the initial value is determined on the basis of the time at which step S77 is executed, the random number data generated in step S77 will be different from all instances of the random number data generated in step S77 in the past. The CPU 42 also functions as a random number generation unit.

Next, the CPU 42 writes the random number data generated in step S77 into the RAM 35 (step S78). In the startup process according to the third embodiment, on the basis of the random number data written in step S78 and the second control program P2, the CPU 52 of the second relay device 22 calculates second computation data for computing second associated data pertaining to the second control program P2, and writes the calculated second computation data into the RAM 35.

After carrying out step S78, the CPU 42 of the HSM 34 determines whether or not the second computation data is stored in the RAM 35 (step S79). If it has been determined that the second computation data is not stored (S79: NO), the CPU 42 carries out step S79 again and stands by until the CPU 52 of the second relay device 22 writes the second computation data into the RAM 35.

If it has been determined that the second computation data is stored (S79: YES), the CPU 42 reads out the second computation data from the RAM 35 (step S80), and on the basis of the read-out second computation data and the second key data K2 stored in the ROM 41, computes the second associated data (step S81).

Next, the CPU 42 reads out the second reference data R2 from the ROM 41 (step S82), and generates first combined data by combining the read-out second reference data R2 with the random number data generated in step S77 (step S83). In step S83, the CPU 42 generates the first combined data by, for example, adding the random number data to the end of the second reference data R2. Next, the CPU 42 calculates first intermediate data on the basis of the first combined data generated in step S83 (step S84). In step S84, the CPU 42 calculates the first intermediate data using a hash function, for example.

Next, the CPU 42 computes third reference data on the basis of the first intermediate data calculated in step S84 and the second key data K2 stored in the ROM 41 (step S85).

As described above, the CPU 42 computes the third reference data on the basis of the random number data, the second reference data R2, and the second key data K2. The CPU 42 functions as a reference data computation unit.

Next, the CPU 42 determines whether or not the second associated data computed in step S81 matches the third reference data computed in step S85 (step S86). The CPU 42 also verifies the second control program P2 as legitimate by carrying out step S86. If it has been determined that the second associated data and the third reference data match (S86: YES), the CPU 42 carries out step S87 assuming that the second control program P2 is legitimate. If it has been determined that the second associated data and the third reference data do not match (S86: NO), the CPU 42 carries out step S88 assuming that the second control program P2 is not legitimate, or in other words, that the second control program P2 has likely been tampered with. After carrying out one of steps S87 and S88, the CPU 42 ends the verification process. After the CPU 42 of the HSM 34 ends the verification process, the power source circuit 36 temporarily stops the supply of power, and the operations are stopped until the supply of power is restarted. After the CPU 42 has ended the verification process, the CPU 32 executes the legitimate first control program P1.

Figure 13:
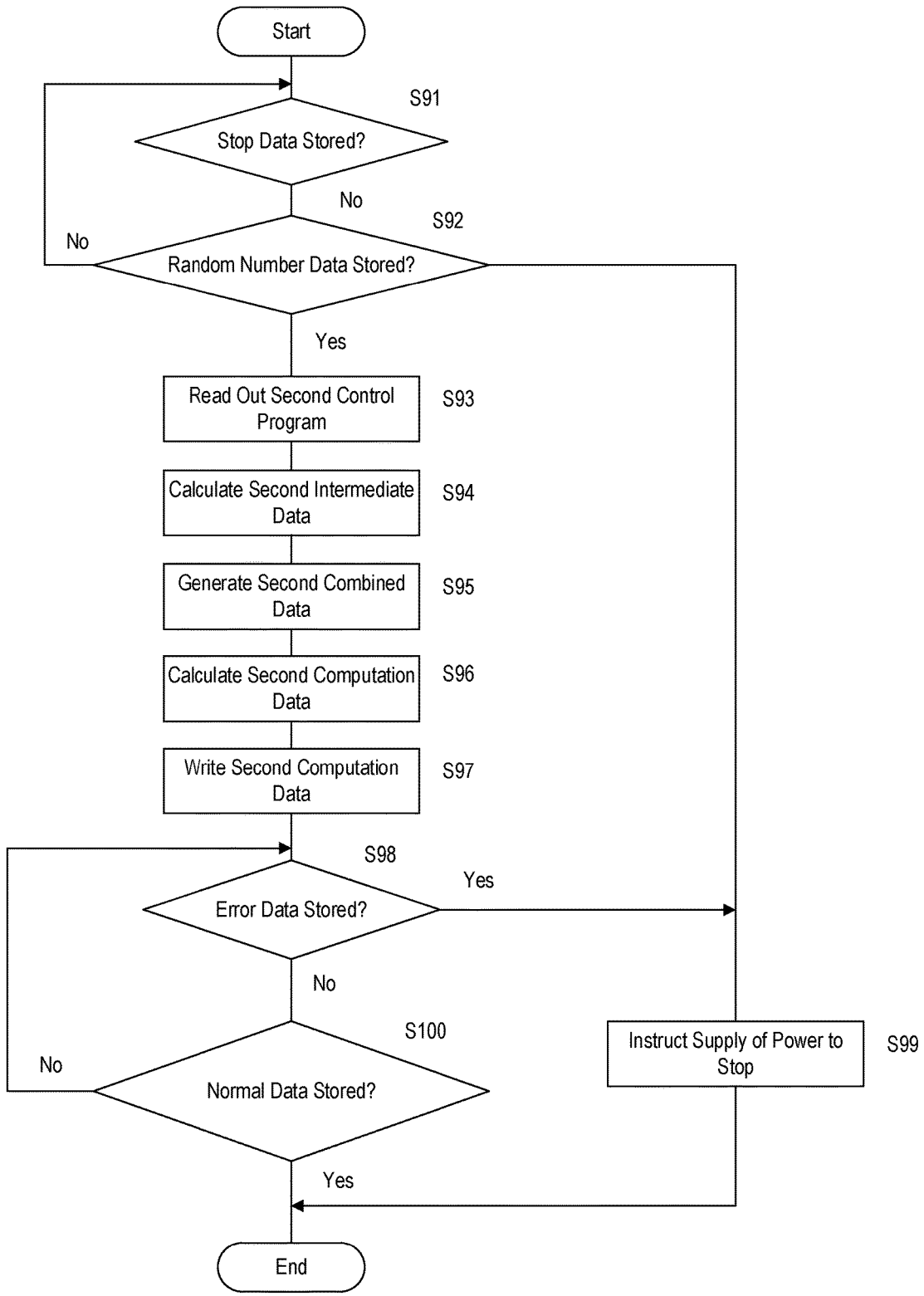
FIG. 13 is a flowchart illustrating a sequence of a startup process.

FIG. 13 is a flowchart illustrating a sequence of the startup process. As in the first embodiment, when the power source circuit 54 has started supplying power to the CPU 52 of the second relay device 22, the CPU 52 executes the startup process in accordance with the startup program Pb before executing the second relay process. In the startup process, first, the CPU 52 determines whether or not stop data is stored in the RAM 35 (step S91). If it has been determined that the stop data is not stored (S91: NO), the CPU 52 determines whether or not random number data is stored in the RAM 35 (step S92).

If it has been determined that the random number data is not stored (S92: NO), the CPU 52 carries out step S91 and stands by until the CPU 42 of the HSM 34 writes the stop data or the random number data into the RAM 35.

Note that if the CPU 42 of the HSM 34 has carried out step S76 of the verification process before the CPU 52 carries out step S91, no data is stored in the RAM 35, and thus the CPU 52 will endlessly repeat the determinations of steps S91 and S92. Thus in the startup process, if the time for which the CPU 52 repeats the determinations of steps S91 and S92 has exceeded a third predetermined amount of time, step S99 may be carried out assuming the first control program P1 is not legitimate.

If it has been determined that the random number data is stored (S92: YES), the CPU 52 reads out the second control program P2 from the ROM 51 (step S93) and calculates second intermediate data on the basis of the read-out second control program P2 (step S94). In step S94, the CPU 52 calculates the second intermediate data using a hash function, for example.

Next, the CPU 52 generates second combined data by combining the second intermediate data calculated in step S94 with the random number data stored in the RAM 35 (step S95). In step S95, the CPU 52 generates the second combined data by, for example, adding the random number data to the end of the second intermediate data. Next, the CPU 52 calculates the second computation data for computing the second associated data on the basis of the second combined data generated in step S95 (step S96). In step S96, the CPU 52 calculates the second computation data using a hash function, for example.

As described above, the CPU 52 calculates the second computation data on the basis of the second control program P2, the random number data, and the second key data K2.

Next, the CPU 52 writes the second computation data calculated in step S96 into the RAM 35 (step S97). As described above, the CPU 42 of the HSM 34 reads out the second computation data stored in the RAM 35, computes the second associated data on the basis of the read-out second computation data, and verifies whether or not the second control program P2 is legitimate. The CPU 42 writes normal data or error data into the RAM 35 on the basis of the verification result.

After carrying out step S97, the CPU 52 determines whether or not the error data is stored in the RAM 35 (step S98). If it has been determined that the stop data is stored (S91: YES), or if it has been determined that the error data is stored (S98: YES), the CPU 52 instructs the power source circuit 54 to stop the supply of power (step S99). As a result, the power source circuit 54 stops the supply of power, and the ROM 51, the CPU 52, and the communication units 53a, 53b, and 53c stop operating. After carrying out step S99, the CPU 52 ends the startup process.

As described thus far, the CPU 42 of the HSM 34 stops the operation of the CPU 42, or in other words, the operation of the second relay device 22, by writing the stop data or the error data into the RAM 35.

As described earlier, if it has been determined that the first associated data pertaining to the first control program P1 does not match the first reference data R1, it is likely that the first control program P1 has been tampered with, and thus the CPU 42 writes the stop data into the RAM 35.

Additionally, if it has been determined that the second associated data pertaining to the second control program P2 does not match the third reference data, it is likely that the second control program P2 has been tampered with, and thus the CPU 42 writes the error data into the RAM 35. The operation of the second relay device 22 is stopped as a result.

If the CPU 52 has determined in step S98 that the error data is stored and has then carried out step S99, the power source circuit 36 of the first relay device 21 does not stop the supply of power, and the CPU 32 of the first relay device 21 executes the first relay process. Thus although the operation of the second relay device 22 stops, the first relay device 21 relays the communication between one of the ECUs 12a and 12a and one of the ECUs 12b and 12b.

If it has been determined that the error data is not stored (S98: NO), the CPU 52 determines whether or not normal data is stored in the RAM 35 (step S100). If it has been determined that the normal data is not stored (S100: NO), the CPU 52 carries out step S98 and stands by until the CPU 42 of the HSM 34 writes the normal data or the error data into the RAM 35. If it has been determined that the normal data is stored (S100: YES), the CPU 52 ends the startup process. The CPU 52 then executes the second relay process.

Figure 14:
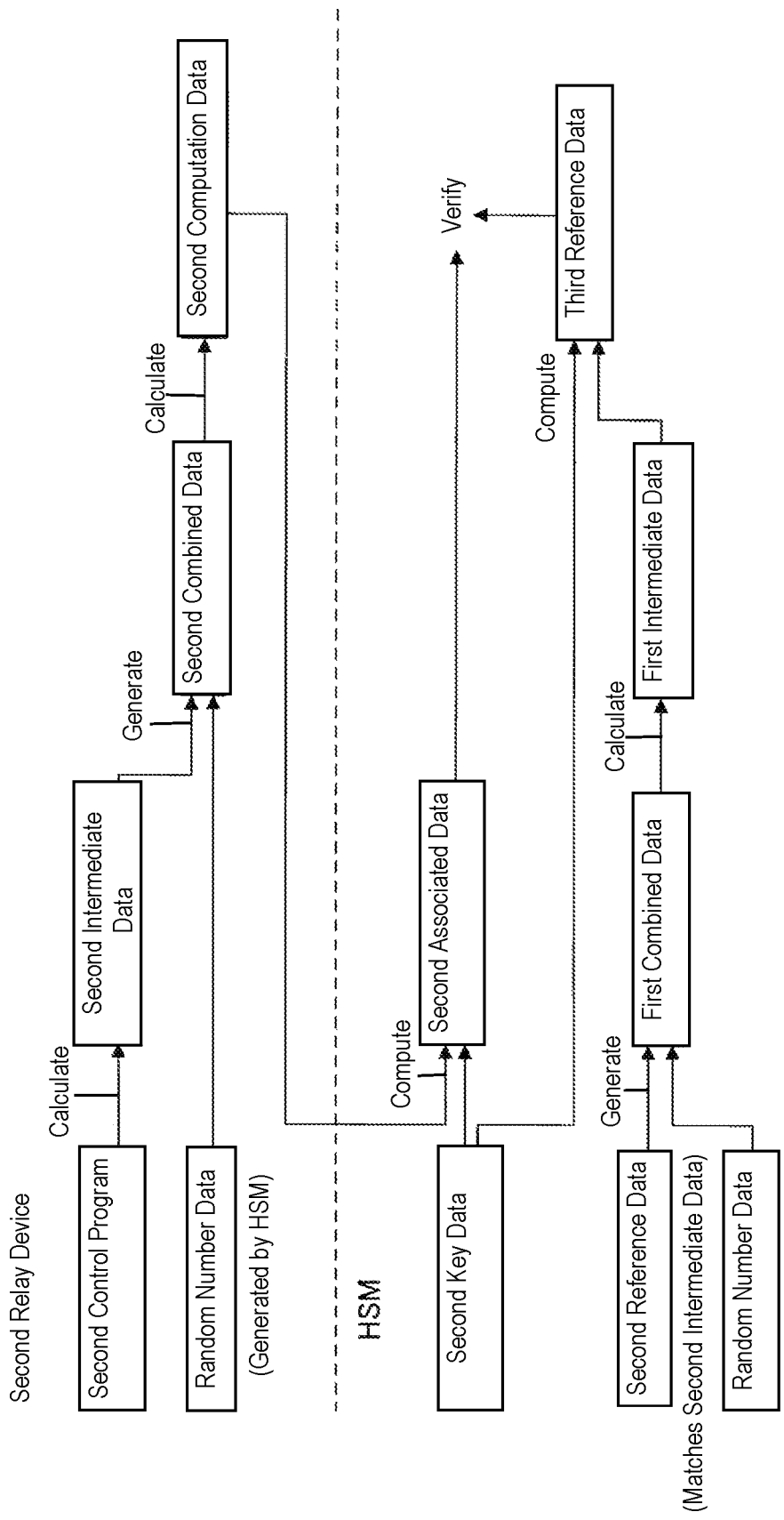
FIG. 14 is a descriptive diagram illustrating verification of a second control program.

FIG. 14 is a descriptive diagram illustrating the verification of the second control program P2. As described earlier, the CPU 52 of the second relay device 22 calculates the second intermediate data on the basis of the second control program P2. Next, the CPU 52 generates second combined data by combining the calculated second intermediate data with the random number data generated by the CPU 42 of the HSM 34. The CPU 52 calculates the second computation data on the basis of the generated second combined data, and writes the calculated second computation data into the RAM 35 of the first relay device 21.

The CPU 42 of the HSM 34 computes the second associated data on the basis of the second computation data stored in the RAM 35 and the second key data K2.

Additionally, the CPU 42 generates the first combined data by combining the second reference data R2 and the random number data. The CPU 42 calculates the first intermediate data on the basis of the generated first combined data. The CPU 42 computes the third reference data on the basis of the calculated first intermediate data and the second key data K2. The CPU 42 verifies the second control program P2 by determining whether or not the second associated data matches the third reference data.

The method of generating the second combined data by combining the second intermediate data and the random number data is the same as the method of generating the first combined data by combining the second reference data and the random number data. The method of calculating the second computation data on the basis of the second combined data is the same as the method of calculating the first intermediate data on the basis of the first combined data. The method of computing the second associated data on the basis of the second computation data and the second key data K2 is the same as the method of computing the third reference data on the basis of the first intermediate data and the second key data K2.

When the second control program P2 is legitimate, the second reference data R2 and the second intermediate data will match. In this case, the second combined data, the second computation data, and the second associated data match the first combined data, the first intermediate data, and the third reference data, respectively, and the normal data is written into the RAM 35.

As described earlier, the random number data is changed each time the verification process is executed. Thus if the second computation data calculated in the previous verification process has been written into the RAM 35 in the current verification process, the second associated data and the third reference data will not match, and the second control program P2 is determined not to be legitimate.

The following method can be considered as a method of tampering with the second control program P2. With the computation data calculated in a past verification process stored, the second control program P2 is tampered with, and the stored computation data is then written into the RAM 35 in a subsequent verification process. However, even if this method is used, the tampering with the second control program P2 will be detected by the relay apparatus according to the third embodiment, and thus the result of verifying the second control program P2 is very reliable.

Additionally, the CPU 42 of the HSM 34 computes the third reference data on the basis of the second key data K2, the random number data, and the second reference data R2, and the CPU 52 of the second relay device 22 computes the second associated data on the basis of the second computation data and the second key data K2, which makes the result of verifying the second control program P2 even more reliable.

According to the relay apparatus 11 configured as described thus far, the CPU 32 of the HSM 34 in the first relay device 21 verifies the second control program P2. It is thus not necessary for the second relay device 22 to have a function for verifying the second control program P2, and thus the relay apparatus 11 is small and inexpensive to produce.

Additionally, the CPU 52 of the second relay device 22 calculates the second computation data of the second control program P2 and writes the calculated second computation data into the RAM 35 of the first relay device 21. The size of the second computation data is smaller than the size of the second control program P2. As such, only a small amount of data is transferred from the second relay device 22 to the first relay device 21 in order to verify that the second control program P2 is legitimate. As a result, only a short amount of time is required for the verification.

Additionally, the relay apparatus 11 according to the third embodiment provides the same effects as those provided by the relay apparatus 11 according to the first embodiment.

Note that in the second embodiment, the CPU 52 of the second relay device 22 may execute the startup process according to the third embodiment. In this case, in the startup process, the CPU 52 carries out steps S61 and S62 of the second embodiment instead of step S93. In step S94, the second intermediate data is calculated on the basis of the second control program P2 read out in step S61.

Fourth Embodiment

With the relay apparatus 11 according to the third embodiment, the CPU 42 of the HSM 34 computes the first associated data on the basis of the first key data K1, and computes the second associated data and the third reference data on the basis of the second key data K2. However, the CPU 42 need not carry out the computations based on the first and second key data K1 and K2.

Hereinafter, points of the fourth embodiment that are different from the third embodiment will be described. Configurations aside from those described hereinafter are the same as in the third embodiment. As such, constituent elements that are the same as in the third embodiment will be given the same reference signs as in the third embodiment, and descriptions thereof will be omitted.

The communication system 1 according to the fourth embodiment differs from the communication system 1 according to the third embodiment in that the details of the verification process executed by the CPU 42 of the HSM 34 in the first relay device 21 are different and the details of the startup process executed by the CPU 52 of the second relay device 22 are different.

Figure 15:
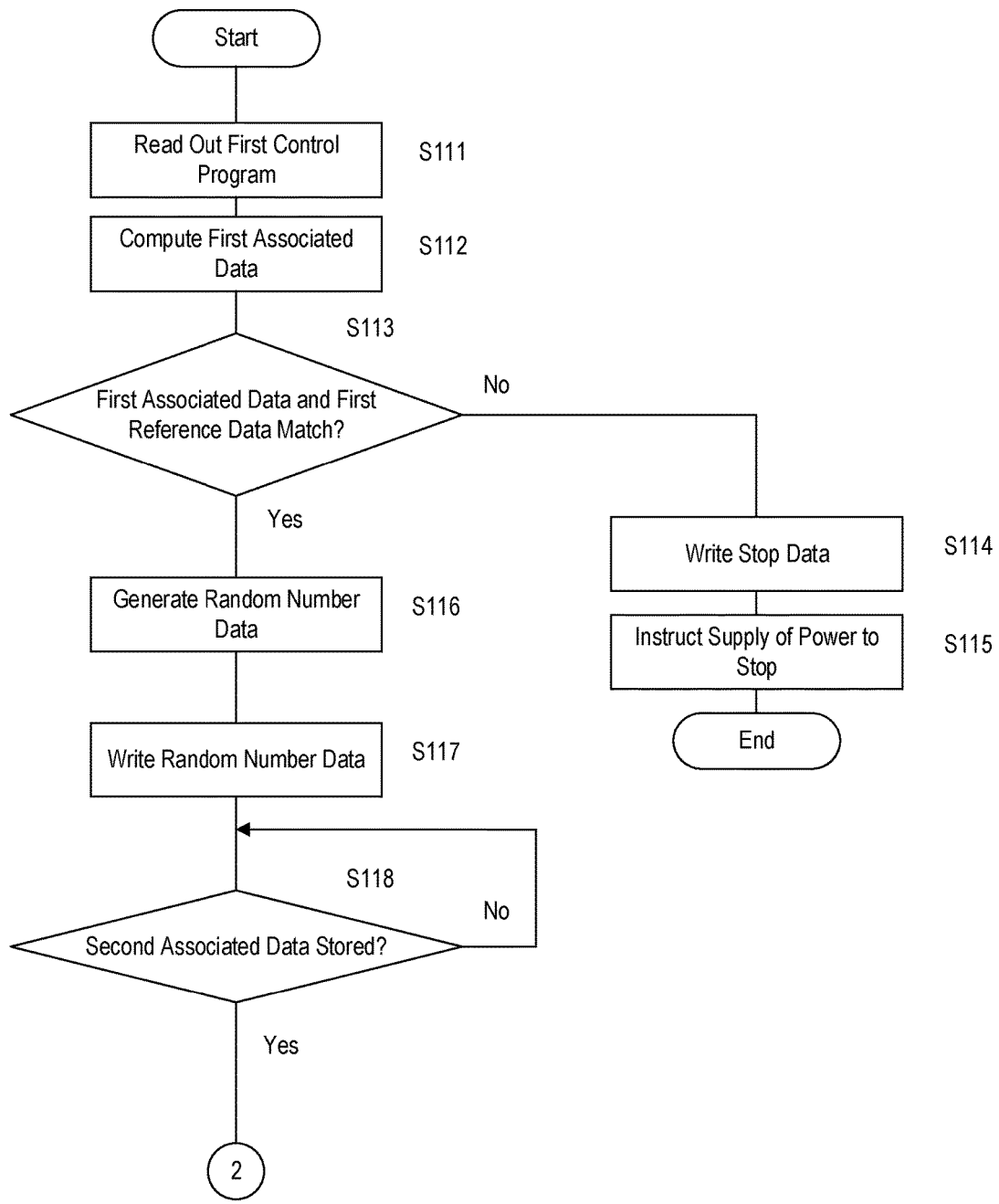
FIG. 15 is a flowchart illustrating a sequence of a verification process according to a fourth embodiment.
Figure 16:
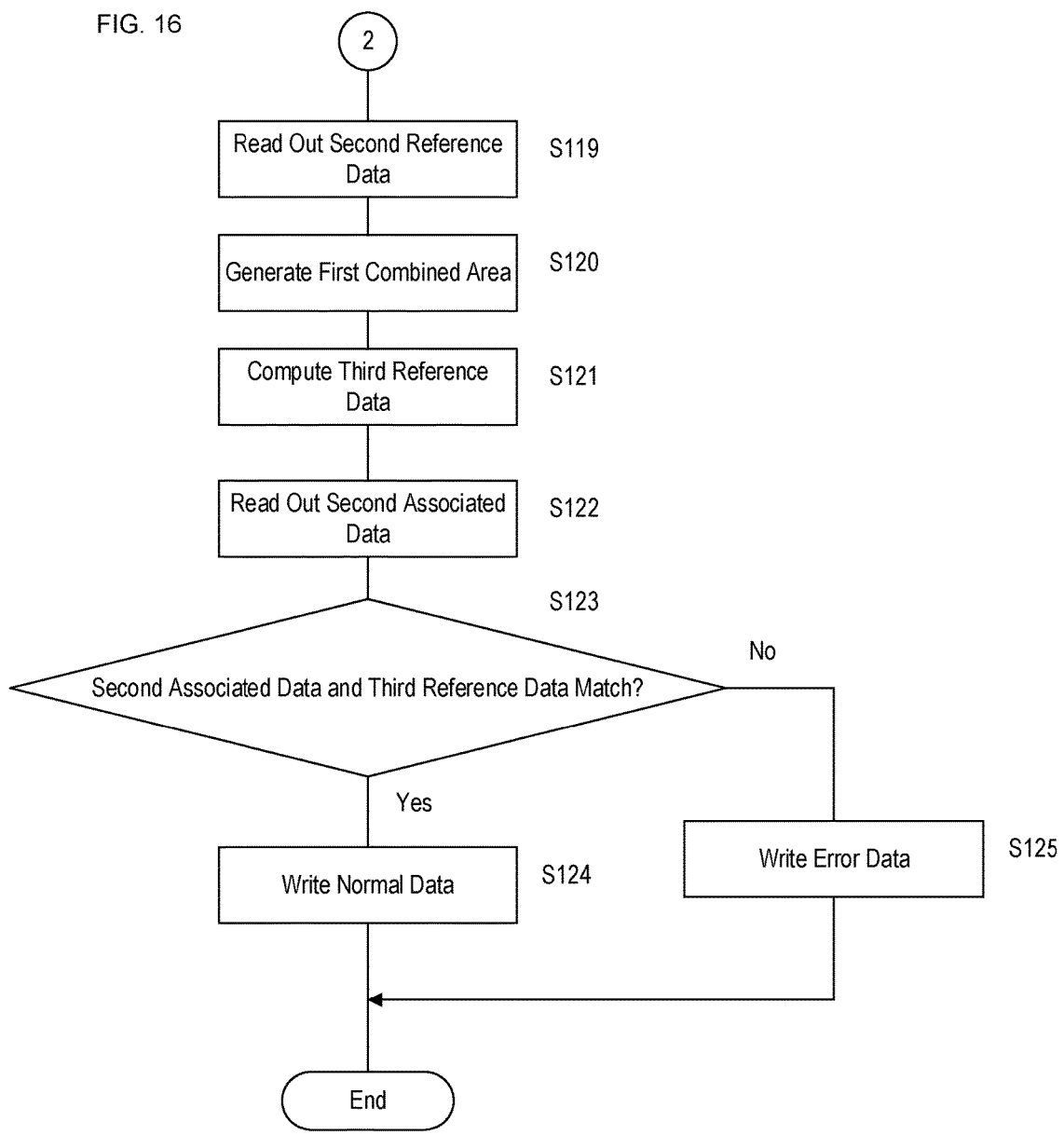
FIG. 16 is a flowchart illustrating a sequence of the verification process according to the fourth embodiment.

FIGS. 15 and 16 are flowcharts illustrating a sequence of a verification process according to the fourth embodiment. As in the third embodiment, when the power source circuit 54 has started supplying power to the CPU 42 of the HSM 34, the CPU 42 executes the verification process before executing the first relay process. The CPU 32 stops operating while the CPU 42 is executing the verification process. Steps S111, S113 to S117, S119, S120, S124, and S125 of the verification process according to the fourth embodiment are the same as steps S71, S74 to S78, S82, S83, S87, and S88 of the verification process according to the third embodiment. Accordingly, steps S111, S113 to S117, S119, S120, S124, and S125 will not be described in detail.

In the verification process, after step S111 has been carried out, the CPU 42 of the HSM 34 computes the first associated data pertaining to the first control program P1 on the basis of the first control program P1 read out in step S111 (step S112). In step S112, the CPU 42 computes the first associated data using a hash function, for example. After carrying out step S112, the CPU 42 carries out step S113.

In step S117, the CPU 42 writes random number data into the RAM 35, as in the third embodiment. In the startup process according to the fourth embodiment, on the basis of the random number data written in step S117 and the second control program P2, the CPU 52 of the second relay device 22 computes the second associated data pertaining to the second control program P2 and writes the computed second associated data into the RAM 35.

After carrying out step S117, the CPU 42 determines whether or not the second associated data is stored in the RAM 35 (step S118). If it has been determined that the second associated data is not stored (S118: NO), the CPU 42 carries out step S118 again and stands by until the CPU 52 of the second relay device 22 writes the second associated data into the RAM 35.

If it has been determined that the second associated data is stored (S118: YES), the CPU 42 carries out steps S119 and S120. Next, the CPU 42 computes the third reference data on the basis of the first combined data generated in step S120 (step S121). In step S121, the CPU 42 computes the third reference data using a hash function, for example.

As described above, the CPU 42 computes the third reference data on the basis of the random number data and the second reference data R2.

Next, the CPU 42 reads out the second associated data from the RAM 35 (step S122). The CPU 42 obtains the second associated data computed by the CPU 52 of the second relay device 22. Next, the CPU 42 determines whether or not the second associated data read out in step S122 matches the third reference data computed in step S121 (step S123). The CPU 42 also verifies the second control program P2 as legitimate by carrying out step S123.

If it has been determined that the second associated data and the third reference data match (S123: YES), the CPU 42 carries out step S124 assuming that the second control program P2 is legitimate. If it has been determined that the second associated data and the third reference data do not match (S123: NO), the CPU 42 carries out step S125 assuming that the second control program P2 is not legitimate, or in other words, that the second control program P2 has likely been tampered with. After carrying out one of steps S124 and S125, the CPU 42 ends the verification process. After the CPU 42 of the HSM 34 ends the verification process, the power source circuit 36 temporarily stops the supply of power, and the operations are stopped until the supply of power is restarted. After the CPU 42 has ended the verification process, the CPU 32 executes the legitimate first control program P1.

Figure 17:
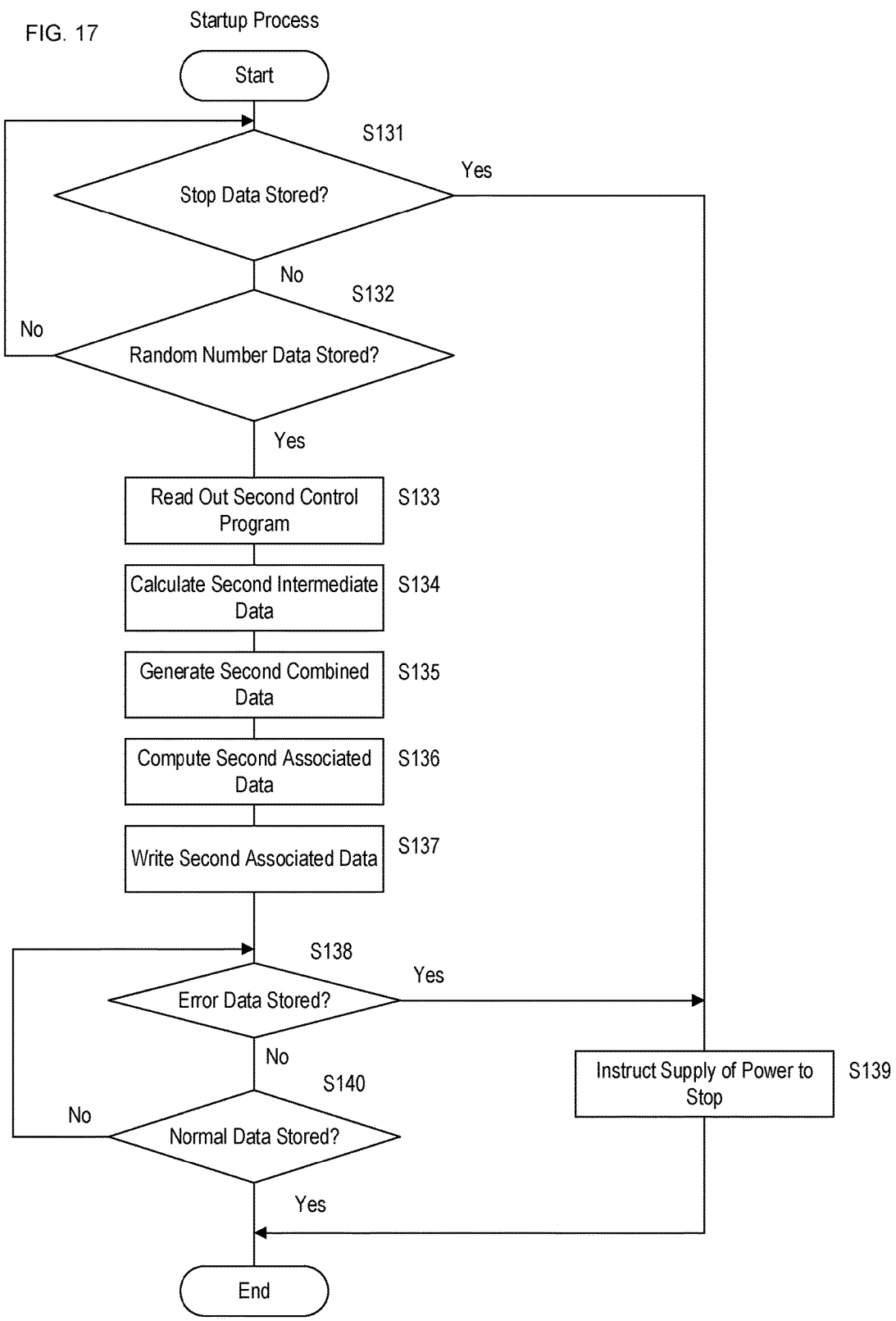
FIG. 17 is a flowchart illustrating a sequence of a startup process.

FIG. 17 is a flowchart illustrating a sequence of the startup process. As in the third embodiment, when the power source circuit 54 has started supplying power to the CPU 52 of the second relay device 22, the CPU 52 executes the startup process in accordance with the startup program Pb before executing the second relay process. Steps S131 to S135 and S138 to S140 of the startup process according to the fourth embodiment are the same as steps S91 to S95 and S98 to S100. Accordingly, steps S131 to S135 and S138 to S140 will not be described in detail.

In the startup process, after step S135 is carried out, the CPU 52 of the second relay device 22 computes the second associated data on the basis of the second combined data generated in step S135 (step S136). In step S136, the CPU 52 computes the second associated data using a hash function, for example.

As described above, the CPU 52 calculates the second computation data on the basis of the second control program P2 and the random number data. In the fourth embodiment, the CPU 52 of the second relay device 22 functions as the associated data computation unit instead of the CPU 42 of the HSM 34.

Next, the CPU 52 writes the second associated data computed in step S136 into the RAM 35 (step S137), and then carries out step S138.

Figure 18:
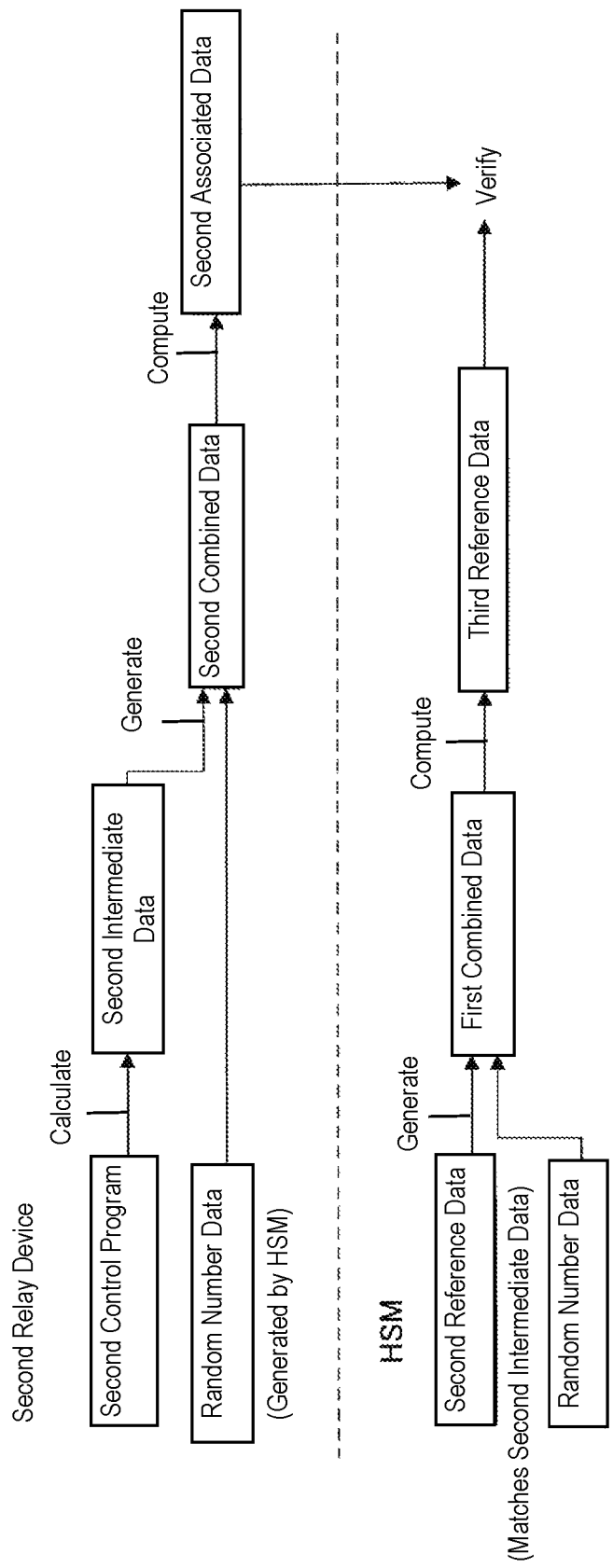
FIG. 18 is a descriptive diagram illustrating verification of a second control program.

FIG. 18 is a descriptive diagram illustrating the verification of the second control program P2. As in the third embodiment, the CPU 52 of the second relay device 22 calculates the second intermediate data on the basis of the second control program P2. Next, the CPU 52 generates second combined data by combining the calculated second intermediate data with the random number data generated by the CPU 42 of the HSM 34. The CPU 52 computes the second associated data on the basis of the generated second combined data, and writes the computed second associated data into the RAM 35 of the first relay device 21.

As in the third embodiment, the CPU 42 of the HSM 34 generates the first combined data by combining the second reference data R2 and the random number data. The CPU 42 computes the third reference data on the basis of the generated first combined data. The CPU 42 verifies the second control program P2 by determining whether or not the second associated data computed by the CPU 52 of the second relay device 22 matches the third reference data.

The method of generating the second combined data by combining the second intermediate data and the random number data is the same as the method of generating the first combined data by combining the second reference data and the random number data. The method of computing the second associated data on the basis of the second combined data is the same as the method of computing the third reference data on the basis of the first combined data.

When the second control program P2 is legitimate, the second reference data R2 and the second intermediate data will match. In this case, the second combined data and the second associated data match the first combined data and the third reference data, respectively, and the normal data is written into the RAM 35.

As described earlier, the random number data is changed each time the verification process is executed. Accordingly, the second associated data read out from the RAM 35 is changed each time the verification process is executed. If the second associated data computed in the previous startup process has been written into the RAM 35 in the current startup process, the second associated data and the third reference data will not match, and the second control program P2 is determined not to be legitimate. Thus the result of verifying the second control program P2 is highly reliable, in the same manner as in the third embodiment.

The first key data K1 and the second key data K2 are not used in the verification process and the startup process according to the fourth embodiment. It is thus not necessary for the first key data K1 and the second key data K2 to be stored in the ROM 41 of the HSM 34.

Additionally, the CPU 52 of the second relay device 22 computes the second associated data pertaining to the second control program P2 and writes the computed second associated data into the RAM 35 of the first relay device 21. The size of the second associated data is smaller than the size of the second control program P2. As such, only a small amount of data is transferred from the second relay device 22 to the first relay device 21 in order to verify that the second control program P2 is legitimate. As a result, only a short amount of time is required for the verification.

The relay apparatus 11 according to the fourth embodiment provides the same effects as those of the relay apparatus 11 according to the third embodiment, aside from the effect achieved by calculating the computation data and the effect achieved by computing the third reference data on the basis of the second key data K2.

Note that in the second embodiment, the CPU 52 of the second relay device 22 may execute the startup process according to the fourth embodiment. In this case, in the startup process, the CPU 52 carries out steps S61 and S62 of the second embodiment instead of step S133, and it is not necessary for the first key data K1 and the second key data K2 to be stored in the ROM 41 of the HSM 34. In step S134, the second intermediate data is calculated on the basis of the second control program P2 read out in step S61.

Additionally, in the third embodiment, if the second computation data calculated on the basis of the second combined data generated by combining the second intermediate data and the random number data is the same as data calculated on the basis of data generated by combining the second control program P2 and the random number data, the calculation of the second intermediate data may be omitted. In this case, the CPU 52 of the second relay device 22 generates the second combined data on the basis of the second control program P2 and the random number data in the startup process.

Likewise, in the fourth embodiment, if the second associated data computed on the basis of the second combined data generated by combining the second intermediate data and the random number data is the same as data calculated on the basis of data generated by combining the second control program P2 and the random number data, the calculation of the second intermediate data may be omitted. In this case, the CPU 52 of the second relay device 22 generates the second combined data on the basis of the second control program P2 and the random number data in the startup process.

In the first to fourth embodiments, the configuration that stops the operation of the second relay device 22 is not limited to causing the power source circuit 54 of the second relay device 22 to stop the supply of power, and the configuration may be such that, for example, a switch provided partway along the power line connecting the battery and the power source circuit 54 is turned off. In this case, the operation of the power source circuit 54 is stopped when the switch is turned off. The power source circuit 54 stops supplying power as a result.

Likewise, the configuration that stops the operation of the first relay device 21 is not limited to causing the power source circuit 36 of the first relay device 21 to stop the supply of power, and the configuration may be such that, for example, a switch provided partway along the power line connecting the battery and the power source circuit 36 is turned off. In this case, the operation of the power source circuit 36 is stopped when the switch is turned off. The power source circuit 36 stops supplying power as a result.

Furthermore, if it has been determined that the second control program P2 is not legitimate, the CPU 42 of the HSM 34 in the first relay device 21 may cause the operations of both the second relay device 22 and the first relay device 21 to stop.

The communication protocol used in the communication relayed by the first relay device 21 is not limited to the CAN protocol. Furthermore, the communication protocol used in the communication relayed by the first relay device 21 may be the same as the communication protocol used in the communication relayed by the second relay device 22.

In the first, second, and third embodiments, the computation data of the second control program P2 or the second computation data may be calculated by the CPU 42 of the HSM 34 in the first relay device 21 rather than by the CPU 52 of the second relay device 22. In this case, the CPU 52 of the second relay device 22 writes the second control program P2 into the RAM 35 of the first relay device 21 in the startup process.

In the first to fourth embodiments, the number of communication lines connected to the first relay device 21 is not limited to two, and may be three or more. Furthermore, the number of ECUs connected to each communication line is not limited to two, and may be one, or three or more. The number of ECUs connected to a given communication line may be different from the number of ECUs connected to another communication line. A plurality of ECUs may be directly connected to the first relay device 21 in the same manner as the vehicle-mounted devices 13a, 13b, and 13c.

Additionally, the number of vehicle-mounted devices connected to the second relay device 22 is not limited to three, and may be two, or four or more. Furthermore, a plurality of communication lines may be connected to the second relay device 22, and one or more vehicle-mounted devices may be connected to each communication line. In this case, the second relay device 22 relays communication between one of the vehicle-mounted devices connected to one of the communication lines and one of the vehicle-mounted devices connected to another communication line.

Additionally, the conversion of the ECU data into the device data and of the device data into the ECU data may be carried out by the CPU 52 of the second relay device 22.

The first to fourth embodiments disclosed here are intended to be in all ways exemplary and in no ways limiting. The scope of the present invention is defined not by the above-described embodiments but by the scope of the claims, and all modifications equivalent in meaning and scope to the scope of the claims are intended to be included therein.

What is claimed is:

1. A vehicle-mounted apparatus including a first vehicle-mounted device having a first processing unit that is configured to execute a process in accordance with a first control program, the vehicle mounted apparatus is configured to verify the first control program using other hardware that is different from hardware constituting the first processing unit, the apparatus comprising:
   a second vehicle-mounted device including a second processing unit that is configured to execute a process in accordance with a second control program;
   an associated data computation unit that is configured to compute associated data pertaining to the second control program; and
   a relay apparatus for relaying data between the first vehicle-mounted device and the second vehicle-mounted device, the relay apparatus including a verifier, wherein the verifier includes a determination unit that is configured to determine whether or not the associated data computed by the associated data computation unit matches reference data;
   a random number generation unit that generates random number data; and
   a reference data computation unit that computes the reference data on the basis of the random number data generated by the random number generation unit and predetermined data;
   the second vehicle-mounted device includes a calculation unit that calculates computation data for computing the associated data on the basis of the second control program and the random number data; and
   the associated data computation unit of the verifier computes the associated data on the basis of the computation data calculated by the calculation unit.

2. The vehicle-mounted apparatus according to claim 1, wherein the verifier verifies the first control program by the other hardware executing a verification program.

3. The vehicle-mounted apparatus according to claim 1, wherein the verifier of the first vehicle-mounted device includes a storage unit that stores key data;
   the reference data computation unit computes the reference data on the basis of the key data stored in the storage unit, the random number data, and the predetermined data; and
   the associated data computation unit computes the associated data on the basis of the computation data and the key data.

4. The vehicle-mounted apparatus according to claim 1, wherein the verifier of the first vehicle-mounted device includes:
   a random number generation unit that generates random number data; and
   a reference data computation unit that computes the reference data on the basis of the random number data generated by the random number generation unit and predetermined data;
   the second vehicle-mounted device includes the associated data computation unit; and
   the associated data computation unit computes the associated data on the basis of the second control program and the random number data.

5. The vehicle-mounted apparatus according to claim 1, further comprising:
   an operation control unit that stops operations of the second vehicle-mounted device in the case where the determination unit of the verifier has determined that the associated data and the reference data do not match.

6. A relay apparatus for a vehicle, the relay apparatus comprising:
   a first relay device that is configured to relay communication among a plurality of first electronic control units; and
   a second relay device that is configured to execute a process in accordance with a control program and to relay communication among a plurality of vehicle-mounted devices, the first relay device and the second relay device being configured to relay communication between the electronic control units and the vehicle-mounted devices,
   wherein the first relay device includes:
   a storage unit that stores key data;
   a computation unit that is configured to compute associated data pertaining to the control program of the second relay device using the key data;
   a determination unit that is configured to determine whether or not the associated data computed by the computation unit matches predetermined data;
   a processing unit that executes a process in accordance with a second control program;
   a second storage unit that stores second key data;
   a second computation unit that computes second associated data pertaining to the second control program using the second key data; and
   a second determination unit that determines whether or not the second associated data computed by the second computation unit matches second predetermined data.

7. The relay apparatus according to claim 6, further comprising:
   an operation control unit that stops operations of the second relay device in the case where the determination unit of the first relay device has determined that the associated data and the predetermined data do not match.

8. The relay apparatus according to claim 6, wherein the second relay device includes a calculation unit that calculates computation data for computing the associated data;

the first relay device includes an obtainment unit that obtains the computation data calculated by the calculation unit; and the computation unit of the first relay device computes the associated data using the key data and the computation data obtained by the obtainment unit.

9. The relay apparatus according to claim 6, further comprising:

a conversion unit that converts data corresponding to a first protocol used in the communication among the plurality of electronic control units into data corresponding to a second protocol used in the communication among the plurality of vehicle-mounted devices, and converts data corresponding to the second protocol into data corresponding to the first protocol.

10. A computer program stored in a non-transitory computer-readable storage medium, the computer program executed by a verifier of a vehicle-mounted apparatus, the vehicle-mounted apparatus including a first vehicle-mounted device and a second vehicle-mounted device, the first vehicle-mounted device having a first processing unit that executes a process in accordance with a first control program and the verifier that verifies the first control program using other hardware that is different from hardware constituting the first processing unit, and the second vehicle-mounted device executing a process in accordance with a second control program, the computer program causing a computer to:

compute associated data pertaining to the second control program; and determine whether or not the computed associated data matches reference data.

11. A computer program stored in a non-transitory computer-readable storage medium, the computer program executed by a verifier of a vehicle-mounted apparatus, the vehicle-mounted apparatus including a first vehicle-mounted device and a second vehicle-mounted device, the first vehicle-mounted device having a first processing unit that executes a process in accordance with a first control program and the verifier that verifies the first control program using other hardware that is different from hardware constituting the first processing unit, and the second vehicle-mounted device executing a process in accordance with a second control program, the computer program causing a computer to:

obtain associated data pertaining to the second control program; and determine whether or not the obtained associated data matches reference data.

12. A computer program stored in a non-transitory computer-readable storage medium, the computer program executed by a first relay device of a relay apparatus for a vehicle, the relay apparatus including the first relay device that relays communication among a plurality of first communication apparatuses and a second relay device that executes a process in accordance with a control program and relays communication among a plurality of second communication apparatuses, and the first relay device and the second relay device relaying communication between the first communication apparatuses and the second communication apparatuses, the computer program causing a computer to:

compute associated data pertaining to the control program of the second relay device using key data stored in advance; and determine whether or not the computed associated data matches predetermined data.

* * * * *